(12) United States Patent
Li

(10) Patent No.: US 12,356,081 B2
(45) Date of Patent: Jul. 8, 2025

(54) PARAMETER ADJUSTMENT METHOD, DISPLAY CONTROL METHOD, ELECTRONIC DEVICE, AND MEDIUM

(71) Applicant: Honor Device Co., Ltd., Shenzhen (CN)

(72) Inventor: Jingwei Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/245,280

(22) PCT Filed: May 13, 2022

(86) PCT No.: PCT/CN2022/092653
§ 371 (c)(1),
(2) Date: Mar. 14, 2023

(87) PCT Pub. No.: WO2023/016008
PCT Pub. Date: Feb. 16, 2023

(65) Prior Publication Data
US 2023/0379588 A1  Nov. 23, 2023

(30) Foreign Application Priority Data

Aug. 9, 2021 (CN) .......................... 202110908422.9

(51) Int. Cl.
*H04N 23/73* (2023.01)
*G06F 3/01* (2006.01)
(Continued)

(52) U.S. Cl.
CPC ............. *H04N 23/73* (2023.01); *G06F 3/013* (2013.01); *G06V 40/161* (2022.01); *H04N 23/71* (2023.01); *H04N 23/76* (2023.01)

(58) Field of Classification Search
CPC ........ H04N 23/73; H04N 23/71; H04N 23/76; H04N 23/90; G06F 3/013; G06V 40/161
See application file for complete search history.

(56) References Cited

U.S. PATENT DOCUMENTS

2010/0079508 A1* 4/2010 Hodge ................. G06F 1/3206
345/697
2020/0134868 A1   4/2020 Liu et al.
(Continued)

FOREIGN PATENT DOCUMENTS

CN       107300967 A       10/2017
CN       108733999 A       11/2018
(Continued)

*Primary Examiner* — Timothy J Henn
(74) *Attorney, Agent, or Firm* — Slater Matsil, LLP

(57) ABSTRACT

Embodiments of this application provide a parameter adjustment method, a display control method, and an electronic device. The electronic device includes a front camera and a display screen, and the front camera is configured to run based on an initial exposure parameter that matches an ambient light brightness in response to a first instruction, to capture an image. The parameter adjustment method includes: obtaining, when the display screen displays data, an image captured by the front camera; calculating an image brightness of the image by using image data of the image, adjusting the initial exposure parameter based on a difference between the image brightness of the image and a standard brightness, to obtain an exposure parameter adjustment value, the exposure parameter adjustment value being configured for the front camera to run based on the exposure parameter adjustment value in response to a second instruction, to capture an image.

20 Claims, 15 Drawing Sheets

(51) Int. Cl.
  *G06V 40/16* (2022.01)
  *H04N 23/71* (2023.01)
  *H04N 23/76* (2023.01)

(56) References Cited

U.S. PATENT DOCUMENTS

| | | | |
|---|---|---|---|
| 2020/0183490 A1 | 6/2020 | Klingström et al. | |
| 2020/0396363 A1* | 12/2020 | Wang | H04N 23/73 |
| 2021/0174768 A1* | 6/2021 | Jarvenpaa | G06F 3/013 |
| 2021/0382542 A1 | 12/2021 | Liu et al. | |
| 2023/0005124 A1* | 1/2023 | Zachrisson | G06T 7/20 |
| 2024/0118746 A1* | 4/2024 | Yerkes | G06F 9/453 |

FOREIGN PATENT DOCUMENTS

| | | | |
|---|---|---|---|
| CN | 109389069 A | 2/2019 | |
| CN | 109413336 A | 3/2019 | |
| CN | 109547701 A | 3/2019 | |
| CN | 109788138 A | 5/2019 | |
| CN | 111083386 A | 4/2020 | |
| CN | 111179860 A | 5/2020 | |
| CN | 112829584 A | 5/2021 | |
| CN | 113596345 A | 11/2021 | |
| EP | 3681371 B1 * | 11/2022 | A61B 3/113 |
| WO | 2020181523 A1 | 9/2020 | |

\* cited by examiner

PARAMETER ADJUSTMENT METHOD, DISPLAY CONTROL METHOD, ELECTRONIC DEVICE, AND MEDIUM

CROSS-REFERENCE TO RELATED APPLICATIONS

This application is a national stage of International Application No. PCT/CN2022/092653, filed on May 13, 2022, which claims priority to Chinese Patent Application No. 202110908422.9, filed on Aug. 9, 2021. The disclosures of both of the aforementioned applications are hereby incorporated by reference in their entireties.

TECHNICAL FIELD

This application relates to the technical field of image processing, and in particular, to a parameter adjustment method, a display control method, an electronic device, and a medium.

BACKGROUND

When a user uses an electronic device to view web pages, news, and articles through, or play games or watch videos, the user gazes at the display screen of the electronic device for a long time. In order to support long-time gaze at the display screen for the user, the electronic device may execute corresponding events, for example, not turning off the display screen, decreasing the ringtone volume, and the like, after detecting that the user looks at the display screen for a long time.

Specifically, the electronic device may capture a face image of the user by using the camera and determine, based on the face image, whether the user looks at the display screen for a long time. The quality of the image captured by the camera restricts the accuracy of the electronic device in determining whether the human eyes of the user gaze at the display screen. In this regard, after the electronic device obtains the image captured by the camera, if it is determined that the image is underexposed or overexposed, exposure parameters of the camera are adjusted, so that the camera captures an image having a normal brightness image based on rational exposure parameters.

However, it takes a long time for the electronic device to adjust the exposure parameters of the camera, resulting in that detection of whether the human eyes in the image gaze at the display screen is time-consuming and has a low accuracy.

SUMMARY

This application provides a parameter adjustment method, a display control method, an electronic device, and a medium, a purpose of which is to reduce time for the electronic device to adjust an exposure parameter of a camera, reduce time of detecting whether human eyes in an image gaze at a display screen, and improve detection accuracy.

To achieve the foregoing objective, this application provides the following technical solutions.

In a first aspect, this application provides a parameter adjustment method, applied to an electronic device. The electronic device includes a front camera and a display screen. The front camera is configured to run based on an initial exposure parameter in response to a first instruction, to capture an image, and the initial exposure parameter of the front camera matches an ambient light brightness. The parameter adjustment method of this application includes: obtaining, when the display screen of the electronic device displays data, an image captured by the front camera; calculating an image brightness of the image by using image data of the image; and adjusting the initial exposure parameter of the front camera based on a difference between the image brightness of the image and a standard brightness, to obtain an exposure parameter adjustment value, the exposure parameter adjustment value being configured for the front camera, so that the front camera runs based on the exposure parameter adjustment value, when receiving a second instruction, in response to the second instruction, to capture an image.

From the above content, it can be learned that: the front camera is configured to run based on the initial exposure parameter that matches the ambient light brightness, to capture an image, which can ensure that the image brightness of the image captured by the camera that runs based on the initial exposure parameter is relatively rational, not excessively bright nor excessively dark; and in this way, the number of times of adjusting the initial exposure parameter of the front camera based on the difference between the image brightness of the image and the standard brightness is few, there is no need to adjust the exposure parameter a plurality of times, and the time for the adjustment of the exposure parameter of the front camera is reduced. In addition, an exposure parameter that meets the requirement of the image brightness is quickly obtained through adjustment, which ensures whether human eyes in an image gaze at the display screen is determined as soon as possible based on an image having an image brightness meeting the requirement, further improving the accuracy of determining whether the human eyes gaze in the image at the display screen.

In a possible implementation, before obtaining, when the display screen displays data, an image captured by the front camera that runs based on an initial exposure parameter in response to a first instruction, the method further includes: determining the initial exposure parameter by using the ambient light brightness.

In a possible implementation, the determining the initial exposure parameter by using the ambient light brightness includes: determining, based on an ambient light brightness-exposure parameter correspondence, an exposure parameter that matches the ambient light brightness.

In a possible implementation, a method for generating the ambient light brightness-exposure parameter correspondence includes: obtaining a plurality of groups of sample images, one group of the sample images being corresponding to one ambient light brightness, and one group of the sample images including a plurality of sample images, and each sample image being corresponding to one exposure parameter; and generating the ambient light brightness-exposure parameter correspondence by using the ambient light brightnesses corresponding to the plurality of groups of the sample images and an exposure parameter corresponding to a sample image in which human eyes gaze at the display screen among the plurality of groups of the sample images.

In a possible implementation, a method for generating the ambient light brightness-exposure parameter correspondence includes: obtaining a plurality of historical exposure parameter adjustment values and ambient light brightnesses corresponding to the historical exposure parameter adjustment values, each historical exposure parameter adjustment value meeting a requirement of the standard brightness; and generating the ambient light brightness-exposure parameter correspondence by using the plurality of historical exposure parameter adjustment values and the ambient light brightnesses corresponding to the historical exposure parameter adjustment values.

In a possible implementation, after the adjusting the initial exposure parameter of the front camera based on a difference between the image brightness of the image and a standard brightness, to obtain an exposure parameter adjustment value, the method further includes: updating the ambient light brightness-exposure parameter correspondence based on the exposure parameter adjustment value.

In a possible implementation, the initial exposure parameter includes at least one of: an exposure duration, an analog gain, and a digital gain.

In a possible implementation, before the adjusting the initial exposure parameter of the front camera based on a difference between the image brightness of the image and a standard brightness, to obtain an exposure parameter adjustment value, the method further includes: determining the standard brightness by using the ambient light brightness.

In this possible implementation, the standard brightness is determined based on the ambient light brightness, the exposure parameter of the front camera is adjusted based on the standard brightness, and the front camera performs capturing based on the exposure parameter adjustment value, to obtain an image meeting the requirement of the standard brightness of the ambient light brightness, so that the image quality of the image captured by the front camera is ensured and the accuracy of determining whether human eyes in the image gaze at the display screen is increased.

In a possible implementation, the determining the standard brightness by using the ambient light brightness includes: determining, based on an ambient light brightness-standard brightness correspondence, the standard brightness that matches the ambient light brightness.

In a possible implementation, a method for generating the ambient light brightness-standard brightness correspondence includes: obtaining a plurality of groups of sample images, one group of the sample images being corresponding one ambient light brightness, and one group of the sample images including a plurality of sample images; and generating the ambient light brightness-standard brightness correspondence by using the ambient light brightnesses corresponding to the plurality of groups of the sample images and an image brightness of a sample image in which human eyes gaze at the display screen among the plurality of groups of the sample images.

In a possible implementation, the ambient light brightness-standard brightness correspondence includes: a plurality of ambient light brightness intervals and standard brightnesses that match the ambient light brightness intervals.

In a possible implementation, the calculating an image brightness of the image by using image data of the image includes: obtaining RGB components of each pixel included in the image; and calculating an average of the RGB components of each pixel in the image and using the average as the image brightness of the image.

In a possible implementation, after the obtaining, when the display screen displays data, an image captured by the front camera that runs based on an initial exposure parameter in response to a first instruction, the method further includes: configuring a confidence level for the image according to a comparison result of image data of the image with a sample feature library, the confidence level being used for representing a probability at which human eyes in the image gaze at the display screen; and if the confidence level of the image is not less than a preset threshold, determining that the preset threshold matches the ambient light brightness, and controlling the display screen not to be turned off.

In this possible implementation, the preset threshold matches the ambient light brightness and the confidence level of the image is compared with the preset threshold, which ensure that the preset threshold with which the confidence level of the image is compared can meet the requirement of the ambient light brightness and guarantee the accuracy of detection of whether the human eyes in the image gaze at the display screen.

In a possible implementation, before the controlling the display screen not to be turned off, the method further includes: determining that there is a frame of image which is among images captured by the front camera within a preset period of time and whose confidence level is not less than the preset threshold, the preset period of time being determined by using a screen off time set for the display screen.

In a possible implementation, the method further includes: controlling, if confidence levels of the images captured by the front camera within the preset period of time are all less than the preset threshold, the display screen to be turned off.

In a possible implementation, before obtaining, when the display screen displays data, an image captured by the front camera that runs based on an initial exposure parameter in response to a first instruction, the method further includes: determining the preset threshold by using the ambient light brightness.

In a possible implementation, the determining the preset threshold by using the ambient light brightness includes: determining, based on an ambient light brightness-threshold correspondence, a threshold that matches the ambient light brightness.

In a possible implementation, the ambient light brightness-threshold correspondence includes: a plurality of ambient light brightness intervals and thresholds that match the ambient light brightness intervals.

In a possible implementation, in the ambient light brightness-threshold correspondence, a threshold that matches a strong light interval and a threshold that matches a weak light interval are less than a threshold that matches a normal light interval.

In this possible implementation, in a dark environment or in a bright environment with strong light, the image brightness of the image captured by the camera is excessively low or excessively high, the image is underexposed or overexposed, and the confidence level configured for the image may be reduced. Correspondingly, in an ambient light brightness value-confidence level threshold correspondence table, a threshold that matches a strong light interval and a threshold that matches a weak light interval are less than a threshold that matches a normal light interval; and in this way, it can be ensured that a lower threshold can be screened from the ambient light brightness-threshold correspondence by using the ambient light brightness, thereby avoiding erroneous determining of whether the human eyes in the image gaze at the display screen caused by that the configured confidence level is less than the threshold due to insufficient or excessively high image brightness, and improving the accuracy of detection of whether the human eyes in the image gaze at the display screen.

In a possible implementation, before the controlling the display screen not to be turned off, the method further includes: obtaining a face detection result of the image; and determining that the face detection result is that a face is detected.

In this possible implementation, if the confidence level of the image is not less than the preset threshold, the face detection result of the image is obtained, and after determining that the face detection result is that a face detected, the display screen is controlled not to be turned off, thereby avoiding erroneous determining of whether the human eyes in the image gaze at the display screen based on the preset threshold that matches the ambient light brightness.

In a second aspect, this application provides a display control method, applied to an electronic device. The electronic device includes a front camera and a display screen. The display control method includes: obtaining, when the display screen displays data, an image captured by the front camera; configuring a confidence level for the image according to a comparison result of image data of the image with a sample feature library, the confidence level being used for representing a probability at which human eyes in the image gaze at the display screen; and determining, if the confidence level of the image is not less than a preset threshold, that the human eyes in the image gaze at the display screen, the preset threshold matching the ambient light brightness.

From the above content, it can be learned that: the preset threshold matches the ambient light brightness and the confidence level of the image is compared with the preset threshold, which ensure that the preset threshold with which the confidence level of the image is compared can meet the requirement of the ambient light brightness and guarantee the accuracy of detection of whether the human eyes in the image gaze at the display screen.

In a possible implementation, after the determining, if the confidence level of the image is not less than a preset threshold, that the human eyes in the image gaze at the display screen, the method further includes: controlling the display screen not to be turned off.

In a possible implementation, before the controlling the display screen not to be turned off, the method further includes: determining that there is a frame of image which is among a plurality of frames of images captured by the front camera within a preset period of time and in which the human eyes gaze at the display screen, the preset period of time being determined by using a screen off time set for the display screen.

In a possible implementation, the method further includes: determining, if the confidence level of the image is less than the preset threshold, that the human eyes in the image do not gaze at the display screen.

In a possible implementation, after the determining, if the confidence level of the image is less than the preset threshold, that the human eyes in the image do not gaze at the display screen, the method further includes: controlling, if none of human eyes in the plurality of frames of images captured by the front camera within the preset period of time gaze at the display screen, the display screen to be turned off, the preset period of time being determined by using the screen off time set for the display screen.

In a possible implementation, before the determining, if the confidence level of the image is not less than a preset threshold, that the human eyes in the image gaze at the display screen, the preset threshold matching the ambient light brightness, the method further includes: determining the preset threshold by using the ambient light brightness.

In a possible implementation, the determining the preset threshold by using the ambient light brightness includes: determining, based on an ambient light brightness-threshold correspondence, a threshold that matches the ambient light brightness.

In a possible implementation, the ambient light brightness-threshold correspondence includes: a plurality of ambient light brightness intervals and thresholds that match the ambient light brightness intervals.

In a possible implementation, in the ambient light brightness-threshold correspondence, a threshold that matches a strong light interval and a threshold that matches a weak light interval are less than a threshold that matches a normal light interval.

In this possible implementation, in a dark environment or in a bright environment with strong light, the image brightness of the image captured by the camera is excessively low or excessively high, the image is underexposed or overexposed, and the confidence level configured for the image may be reduced. Correspondingly, in an ambient light brightness value-confidence level threshold correspondence table, a threshold that matches a strong light interval and a threshold that matches a weak light interval are less than a threshold that matches a normal light interval; and in this way, it can be ensured that a lower threshold can be screened from the ambient light brightness-threshold correspondence by using the ambient light brightness, thereby avoiding erroneous determining of whether the human eyes in the image gaze at the display screen caused by that the configured confidence level is less than the threshold due to insufficient or excessively high image brightness, and improving the accuracy of detection of whether the human eyes in the image gaze at the display screen.

In a possible implementation, the initial exposure parameter of the front camera matches the ambient light brightness.

In this possible implementation, the front camera is configured to run based on the initial exposure parameter that matches the ambient light brightness, to capture an image, which can ensure that the image brightness of the image captured by the camera that runs based on the initial exposure parameter is relatively rational, not excessively bright nor excessively dark; and in this way, the number of times of adjusting the initial exposure parameter of the front camera based on the difference between the image brightness of the image and the standard brightness is few, there is no need to adjust the exposure parameter a plurality of times, and the time for the adjustment of the exposure parameter of the front camera is reduced. In addition, an exposure parameter that meets the requirement of the image brightness is quickly obtained through adjustment, which ensures whether human eyes in an image gaze at the display screen is determined as soon as possible based on an image having an image brightness meeting the requirement, further improving the accuracy of determining whether the human eyes gaze in the image at the display screen.

In a possible implementation, before the obtaining, when the display screen displays data, an image captured by the front camera, the method further includes: determining, based on the ambient light brightness-exposure parameter correspondence, the initial exposure parameter.

In a possible implementation, a method for generating the ambient light brightness-exposure parameter correspondence includes: obtaining a plurality of groups of sample images, one group of the sample images being corresponding to one ambient light brightness, and one group of the sample images including a plurality of sample images, and each sample image being corresponding to one exposure parameter; and generating the ambient light brightness-exposure parameter correspondence by using the ambient light brightnesses corresponding to the plurality of groups of the sample images and an exposure parameter corresponding to a sample image in which human eyes gaze at the display screen among the plurality of groups of the sample images.

In a possible implementation, a method for generating the ambient light brightness-exposure parameter correspondence includes: obtaining a plurality of historical exposure parameter adjustment values and ambient light brightnesses corresponding to the historical exposure parameter adjustment values, each historical exposure parameter adjustment value meeting a requirement of the standard brightness; and generating the ambient light brightness-exposure parameter correspondence by using the plurality of historical exposure parameter adjustment values and the ambient light brightnesses corresponding to the historical exposure parameter adjustment values.

In a possible implementation, the initial exposure parameter includes at least one of: an exposure duration, an analog gain, and a digital gain.

In a possible implementation, before the determining that the human eyes in the image gaze at the display screen, the method further includes: obtaining a face detection result of the image; and determining that the face detection result is that a face is detected.

In this possible implementation, if the confidence level of the image is not less than the preset threshold, the face detection result of the image is obtained, and after determining that the face detection result is that a face detected, it is determined that the human eyes in the image gaze at the display screen, thereby avoiding erroneous determining of whether the human eyes in the image gaze at the display screen based on the preset threshold that matches the ambient light brightness.

In a third aspect, this application provides an electronic device, including: a display screen, an ambient light detector, a front camera, one or more processors, and a memory, storing a program. The display screen is configured to display data; the ambient light detector is configured to detect ambient light to obtain an ambient light brightness; the front camera is configured to run, when the display screen displays data, based on an initial exposure parameter to capture an image; the program in the memory, when executed by the one or more processors, causes the electronic device to perform the parameter adjustment method in the first aspect or any possible implementation of the first aspect, or the display control method in the second aspect or any possible implementation of the second aspect.

In a fourth aspect, this application provides a readable storage medium, storing a computer program. The computer program, when executed by a processor, causes the processor to implement the parameter adjustment method in the first aspect or any possible implementation of the first aspect, or the display control method in the second aspect or any possible implementation of the second aspect.

DETAILED DESCRIPTION OF ILLUSTRATIVE EMBODIMENTS

In the specification, claims, and accompanying drawings of this application, the terms "first", "second", "third", and so on are intended to distinguish different objects but do not indicate a particular order.

In the embodiments of this application, the terms, such as "exemplarily" and "for example", are used to represent giving an example, an illustration or a description. Any embodiment or design scheme described by using "exemplarily" or "for example" in the embodiments of this application should not be explained as being more preferred or having more advantages than another embodiment or design scheme. Exactly, use of the term, such as "exemplarily" or "for example", is intended to present a related concept in a specific manner.

A user may view web pages, news, articles, and the like through an electronic device, or may play games or watch videos through an electronic device. When a user uses an electronic device to view web pages, news, and articles through, or play games or watch videos, the user gazes at the display screen of the electronic device for a long time. In order to support long-time gaze at the display screen for the user, the electronic device may execute corresponding events, for example, not turning off the display screen, decreasing the ringtone volume, and the like, after detecting that the user looks at the display screen for a long time.

Figure 1:
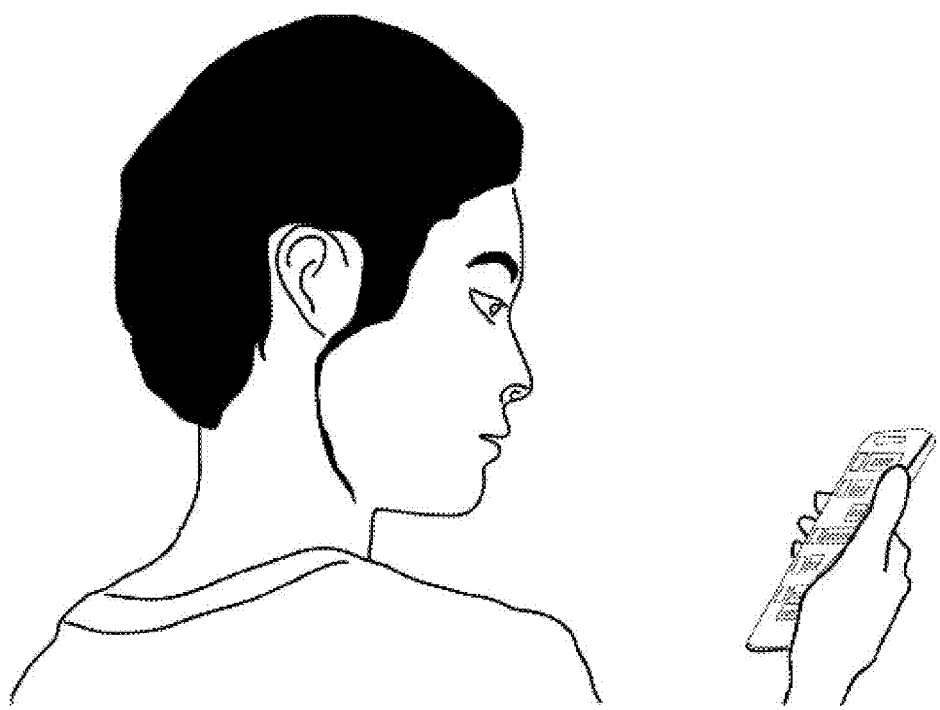
FIG. 1 is a diagram of an application scenario of an electronic device according to this application.

FIG. 1 illustrates a scenario in which a user views web pages through an electronic device. For example, in the scenario, the following introduces a solution of executing a corresponding event by detecting long-time gaze of the user at a display screen.

Figure 2A:
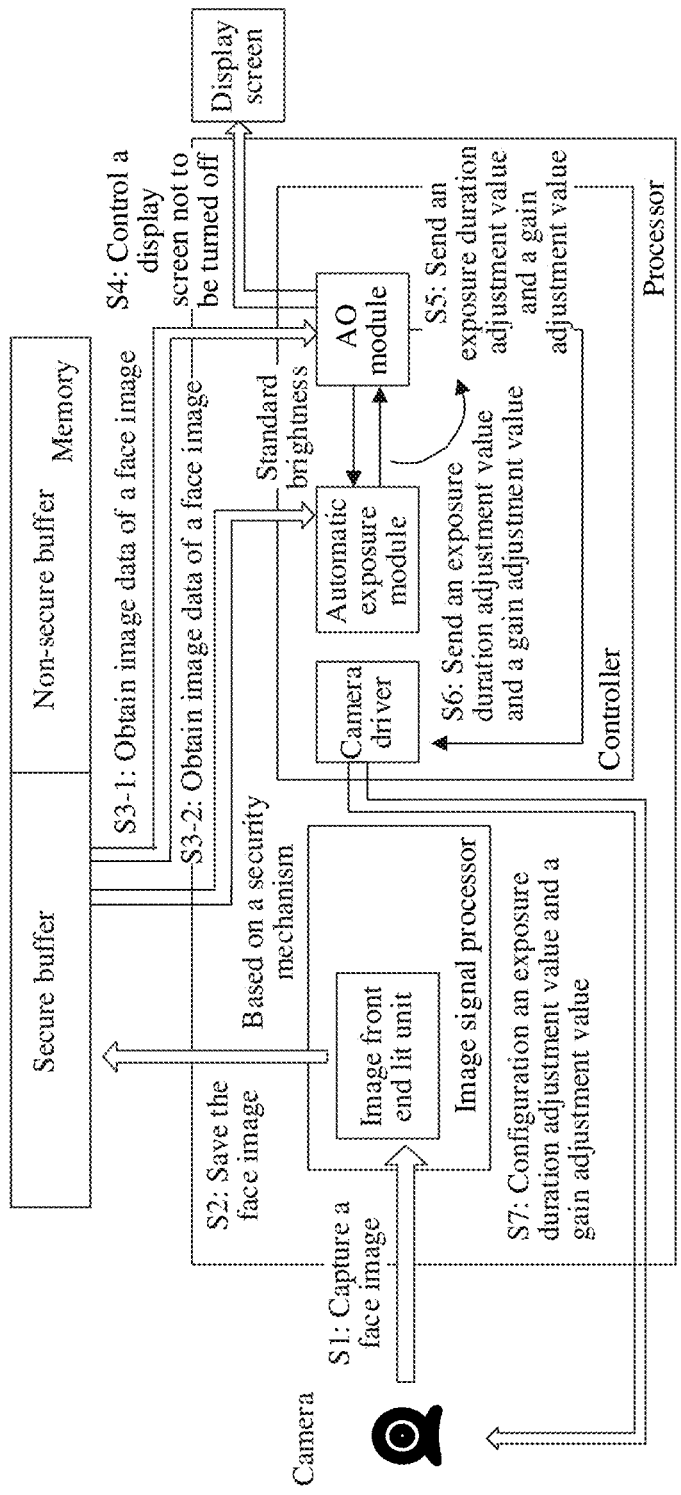
FIG. 2A is a schematic structural diagram of the electronic device according to this application.

Referring to FIG. 2A, an image front end lit (Image Front End lit, IFE lit) unit is an integrated unit in an image signal processor, and an image outputted by a camera may reach the IFE lit integrated unit, which stores the image outputted by the camera in a secure buffer of a memory.

An automatic exposure module is a logic unit of a controller and is obtained by executing an automatic exposure (automatic exposure, AE) algorithm by the controller.

An AO (always on) module is also a logical unit of a controller and is obtained by executing an AO (always on) solution by the controller. An AO solution refers to an intelligent perception solution implemented based on AO camera (always on camera), usually includes functions such as human eyes gaze recognition, owner recognition, hand gesture recognition, and the like, and has a typical feature of running for a long time at a low power consumption.

A camera driver is also a logic unit of a controller and is configured to configure a parameter for a camera, to turn on or turn off the camera.

A display screen of the electronic device displays a web page, and a user looks at the display screen of the electronic device to view the web page. As shown in FIG. 2A, the electronic device sends an instruction, and a front camera of the electronic device runs in response to an instruction, to perform step S1 of capturing a face image of a user. The IFE lit unit performs step S2 of reading the face image and storing the face image to a secure buffer of a memory based on a security mechanism. The AO module performs step S3-1 of obtaining image data of the face image stored in the secure buffer of the memory and determining, by analyzing the image data, whether human eyes of the user gaze at the display screen. When the AO module determines that the human eyes of the user gaze at the display screen, step S4 of controlling the display screen of the electronic device not to be turned off is performed.

The image quality of the face image captured by the camera restricts the accuracy of the AO module in determining whether the human eyes of the user gaze at the display screen. In particular, when an image brightness of the face image captured by the camera is high or low, an error in determining, by the AO module, whether the human eyes of the user gaze at the display screen is relatively large. In this regard, in FIG. 2A, according to step S3-2, the automatic exposure module obtains image data of the face image stored in the memory; calculates an image brightness of the face image by using the image data and comparing the calculated image brightness and a standard brightness, to obtain a comparison result; and adjusts exposure parameters, which are usually an exposure duration and a gain, of the camera, to obtain an exposure duration adjustment value and a gain adjustment value. The automatic exposure module also performs step S5 of transmitting the calculated exposure duration adjustment value and gain adjustment value to the AO module. Then, according to step S6 in FIG. 2A, the AO module sends the exposure duration adjustment value and the gain adjustment value to a camera driver. According to step S7 in FIG. 2A, the camera driver configures the camera to run based on the exposure duration adjustment value and the gain adjustment value. The electronic device may send an instruction again, and the camera runs based on the exposure duration adjustment value and the gain adjustment value in response to the instruction of the electronic device, to capture an image.

Figure 2B:
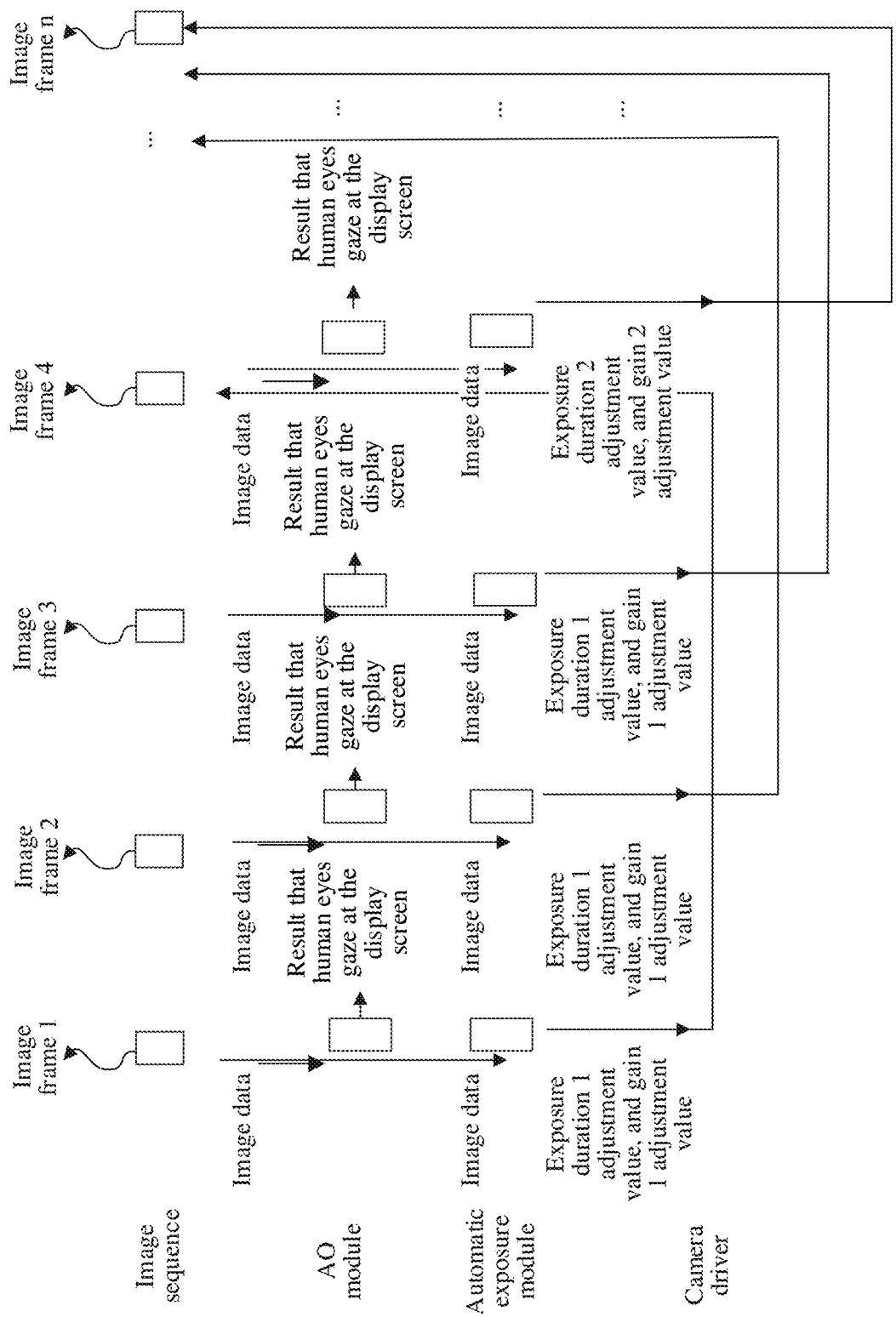
FIG. 2B a diagram illustrating an operation process of a logic unit in an electronic device according to this application.

The following describes, in combination with FIG. 2B, specific implementations for the AO module to determine, by analyzing the image data, whether human eyes of the user gaze at the display screen, and for the automatic exposure module to adjust the exposure parameters of the camera.

Referring to FIG. 2B, an image sequence includes a plurality of frames of images, such as image frames 1, 2, 3, 4 . . . , and n, captured by the camera. The camera starts to run based on a universal exposure duration and gain. Generally, the universal exposure duration and gain may be preset. The automatic exposure module successively obtains image data of each frame of image in the image sequence according to a storage order of the images. For the first frame image (also referred to as an image frame 1), the automatic exposure module calculates an image brightness of the image frame 1 by using image data of the image frame 1, and compares the image brightness of the image frame 1 and a standard brightness, to obtain a comparison result. If the comparison result reflects that a difference between the image brightness of the image frame 1 and the standard brightness is less than a preset value (for example, 10%), the automatic exposure module does not perform an operation, and the camera still runs based on the original exposure duration and gain, which refer to the foregoing universal exposure duration and gain. If the comparison result reflects that difference between the image brightness of the image frame 1 and the standard brightness is not less than the preset value, the automatic exposure module adjusts the exposure duration and gain of the camera according to the comparison result, to obtain an exposure duration 1 adjustment value and a gain 1 adjustment value. The automatic exposure module transmits the exposure duration 1 adjustment value and the gain 1 adjustment value to the camera driver through the AO module. The camera driver configures the camera to run based on the exposure duration 1 adjustment value and the gain 1 adjustment value, to capture an image.

Affected by lag of one frame of image in capturing by the camera each time the automatic exposure module and the camera driver perform the process once, assuming that an image frame 2 and an image frame 3 are captured by the camera that runs based on the original exposure duration and gain, the automatic exposure module performs calculation by using image data of the image frame 2 and the image frame 3 according to the foregoing processing method, to obtain the exposure duration 1 adjustment value and the gain 1 adjustment value; and the camera driver configures the camera to similarly run based on the exposure duration 1 adjustment value and the gain 1 adjustment value, to capture an image. An image frame 4 is captured by the camera configured with the exposure duration 1 adjustment value and the gain 1 adjustment value. The automatic exposure module also performs calculation by using image data of the image frame 4 in the foregoing processing method, to obtain an exposure duration 2 adjustment value and a gain 2 adjustment value; and the camera driver configures the camera to run based on the exposure duration 2 adjustment value and the gain 2 adjustment value, to capture an image. The process is repeated until the automatic exposure module obtains through comparison that a difference between an image brightness of an image frame and the standard brightness is less than a preset value, for example, ±10%.

The AO module also successively obtains image data of each frame of image in the image sequence according to a storage order of the images. For the image data of each frame of image obtained by the AO module, the AO module performs the following process, to obtain a determining result for whether human eyes in each frame of image gaze at the display screen. A description is provided below by an example in which the AO module processes the image data of the image frame 1.

The AO module compares the image data of the image frame 1 and a sample feature library and configures a confidence level for the image frame 1 according to a comparison result of the image data of the image frame 1 and the sample feature library. The confidence level is used for representing a probability at which human eyes in the image frame 1 gaze at the display screen. The AO module determines whether the confidence level of the image frame 1 is less than a threshold, if the confidence level of the image frame 1 is not less than the threshold, determines that the human eyes in the image frame 1 gaze at display screen, and if the confidence level of the image frame 1 is less than the threshold, determines that the human eyes in the image frame 1 do not gaze at the display screen.

In some embodiments, the sample feature library includes feature data of an image in which human eyes gaze at the display screen. A method for determining the feature data includes: obtaining a large number of sample images, which include sample images in which human eyes gaze at the display screen and sample images in which human eyes do not gaze at the display screen, and learning by using image data of each sample image, to obtain the feature data for representing that human eyes in an image gaze at the display screen. The sample images in which the human eyes gaze at the display screen and the sample images in which the human eyes do not gaze at display screen all refer to face images captured by a front camera of an electronic device.

If the AO module determines that there is a frame of image which is among images within a specific period of time and in which human eyes gaze at the display screen, the AO module performs corresponding events such as controlling the display screen of the electronic device not to be turned off and decreasing the ringtone volume.

The foregoing proposed solution in which the AO module analyzes the image data to determine whether the human eyes of the user gaze at the display screen and the automatic exposure module adjusts the exposure parameter of the camera has the following problems:

Problem 1: It takes a long time for the automatic exposure module to adjust the exposure parameter of the camera, and the detection accuracy of determining, by the AO module, whether the human eyes in the image gaze at the display screen is reduced.

Figure 3:
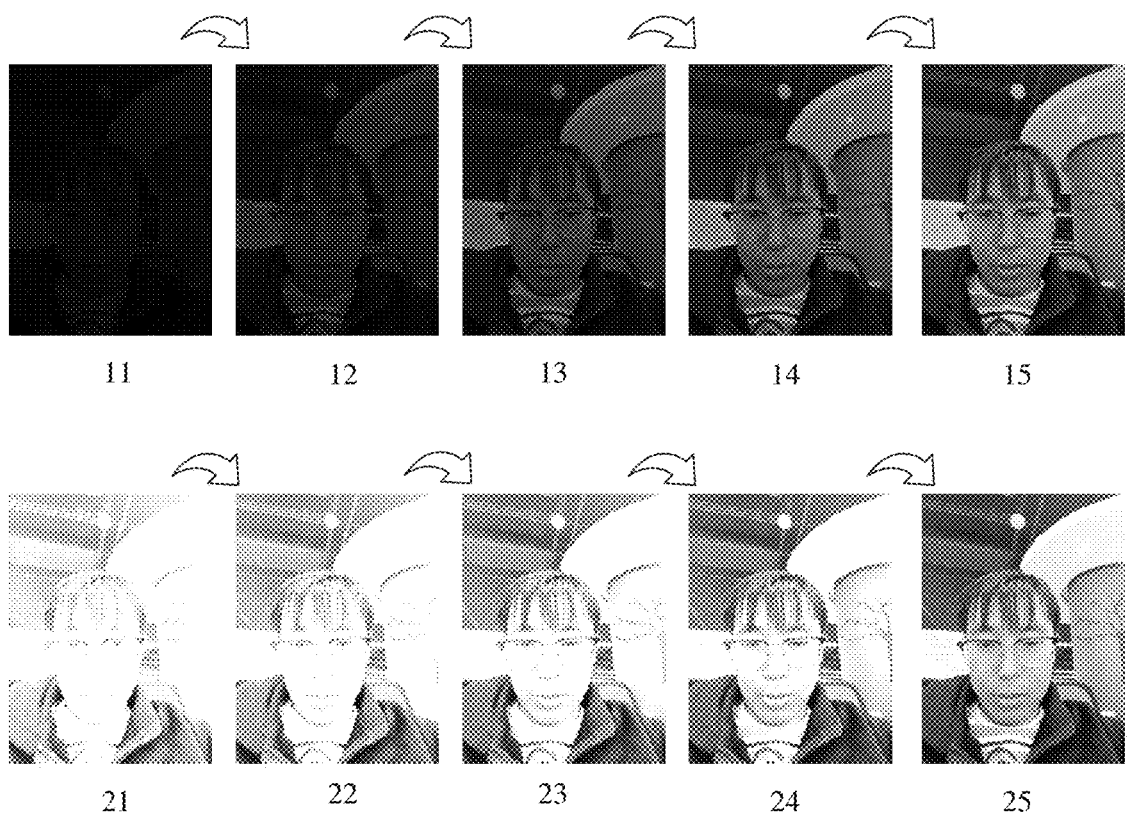
FIG. 3 is a diagram illustrating a plurality of frames of images captured by the camera according to this application.

When a user uses the electronic device in a dark environment or in a bright environment with strong light, an image brightness of an image captured by the camera of the electronic device in the dark environment or in the bright environment with strong light may also be excessively dark or excessively bright. As shown in FIG. 3, an image 11 is captured in a dark environment by a camera that runs based on universal exposure duration and gain, and an image 21 is captured in a bright environment with strong light by a camera that runs based on universal exposure duration and gain. The automatic exposure module obtains image data of the image 11 and adjusts the universal exposure duration and gain of the camera according to the processing procedure proposed in FIG. 2B by using the image data of the image 11, to obtain an exposure duration adjustment value and a gain adjustment value. An image captured by the camera based on the exposure duration adjustment value and the gain adjustment value is an image 12. The automatic exposure module obtains image data of the image 12 and then further adjusts the exposure duration and gain of the camera; and the process is repeated, until the automatic exposure module obtains, by using image data of an image 14, an exposure duration and gain of the camera and provides the exposure duration and gain to the camera, and an image brightness of an image 15 captured by the camera meet a requirement. Similarly, according to the exposure duration and gain adjusted by the automatic exposure module, the camera successively captures an image 22 to an image 25, and an image brightness of the image 25 meet a requirement.

Further, the automatic exposure module shortens the difference between the image brightness of the image and the standard brightness at a smaller step length and adjusts the exposure duration and gain accordingly, and as a result, the image brightness of the image obtained by the automatic exposure module is excessively bright or excessively dark, for which the exposure duration and gain need to be repeatedly adjusted, so that the image brightness of the image captured by the camera can be ensured to meet the requirement. This brings about the problem that it takes a long time for the automatic exposure module to adjust the exposure parameters of the camera.

In the process in which the automatic exposure module repeatedly adjusts the exposure duration and gain until rational exposure duration and gain are provided to the camera to capture an image that meets the requirement, the AO module may obtain image data for each frame of image captured by the camera, to determine whether human eyes in the image gaze at the display screen. However, if the image brightness of the image does not meet the requirement, the accuracy of determining, by the AO module, whether the human eyes in the image gaze at the display screen may reduce.

Problem 2: The standard brightness may be set irrationally, and as a result, an automatic exposure adjustment module cannot accurately adjust the exposure duration and gain, thereby affecting the image quality of an image captured by the camera and reducing the detection accuracy of determining, by the AO module, whether human eyes in the image gaze at the display screen.

The electronic device is in an environment with different brightnesses, and the automatic exposure adjustment module determines whether an image brightness of an image meets a requirement based on a universal standard brightness and adjusts the exposure duration and gain based on the standard brightness when the requirement is not met. The universal standard brightness itself cannot guarantee that brightnesses of images captured by the camera in different brightness environments are rational, and adjustment of the exposure duration and parameter adjustment based on the standard brightness may lead to that the automatic exposure adjustment module cannot accurately adjust the exposure duration and gain. The exposure duration and gain cannot be accurately adjusted, the image quality of an image captured by the camera that runs based on the adjusted exposure duration and gain and the image is reduced, and the accuracy of determining, by the AO module by using the image having a low image quality, whether the human eyes in the image gaze at the display screen is certainly low.

Problem 3: The threshold of the confidence level may be set irrationally, and as a result, the detection accuracy of determining, by the AO module based on the threshold, whether human eyes in an underexposed image or an overexposed image gaze at the display screen is low.

In a dark environment or in a bright environment with strong light, the image brightness of the image captured by the camera is excessively low or excessively high, the image is underexposed or overexposed, the confidence level configured by the AO module for the image may be reduced. As a result, even if human eyes in an image gaze at the display screen, the AO module may make erroneous determining caused by that the confidence level configured by the AO module is less than the threshold due to an insufficient or excessively high image brightness, thereby affecting the detection accuracy of the AO module.

Based on the problems in the foregoing technical solutions, this application proposes three solutions through the following three embodiments.

The three solutions provided in the embodiments of this application may be applied to an electronic device such as a mobile phone, a tablet computer, a desktop computer, a laptop computer, a notebook computer, an ultra-mobile personal computer (Ultra-Mobile Personal Computer, UMPC), a handheld computer, a netbook, a personal digital assistant (Personal Digital Assistant, PDA), a wearable electronic device, a smartwatch, and the like.

Figure 4A:
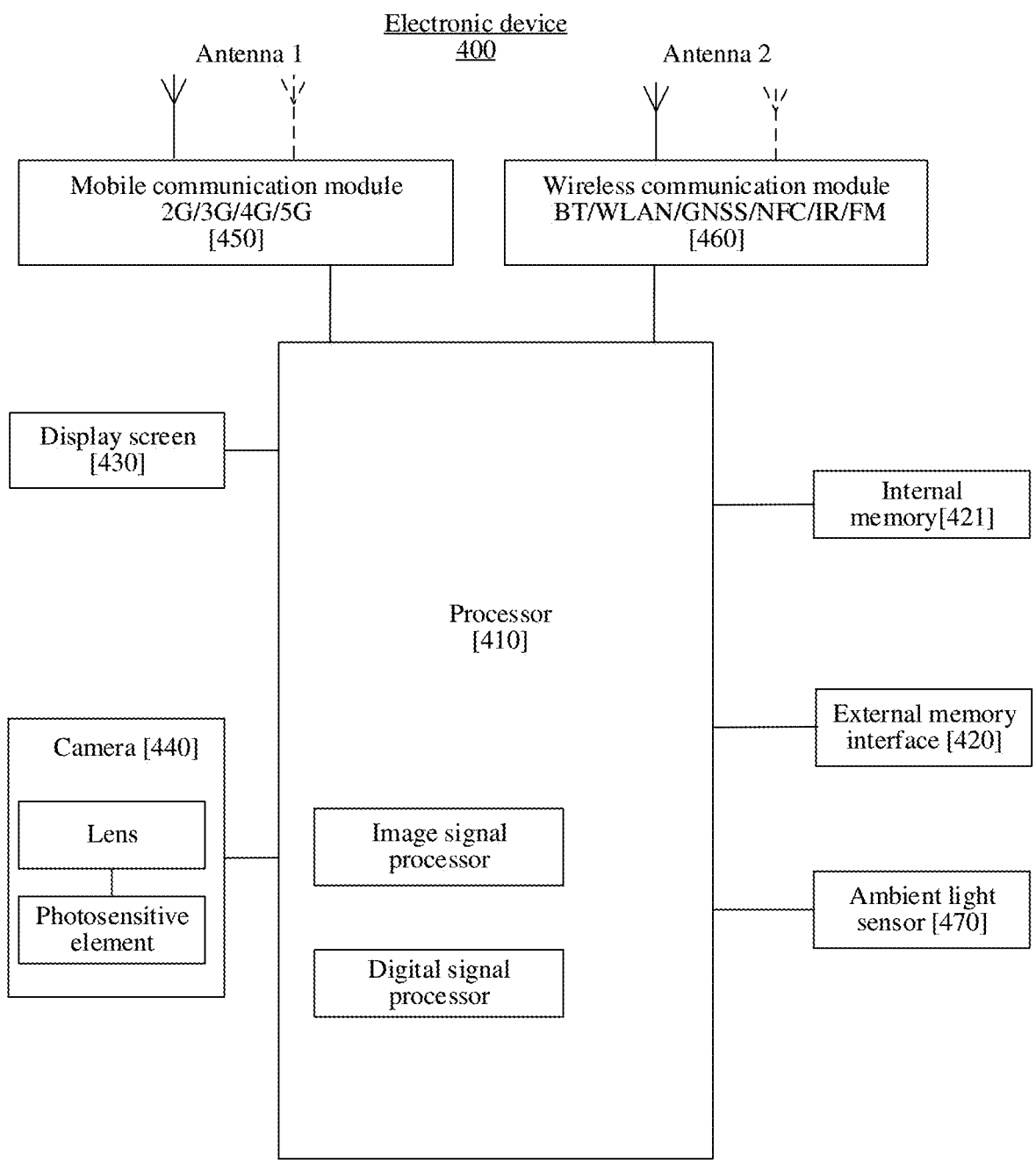
FIG. 4A is a schematic structural diagram of an electronic device according to an embodiment of this application.

FIG. 4A illustrates a composition example of an electronic device according to an embodiment of this application. For example, for a mobile phone, an electronic device 400 may include a processor 410, an external memory interface 420, an internal memory 421, a display screen 430, a camera 440, an antenna 1, an antenna 2, a mobile communication module 450, a wireless communication module 460, an ambient light sensor 470, and the like.

It may be understood that an example structure in this embodiment does not constitute a specific limitation on the electronic device. In some other embodiments, the electronic device may include more or fewer components than those shown in the figure, or some components may be combined, or some components may be split, or components are arranged in different manners. The components in the figure may be implemented by hardware, software, or a combination of software and hardware.

The processor 410 may include one or more processing units. For example, the processor 410 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 400. The controller may generate an operation control signal based on an instruction operation code and a timing signal, and read an instruction and control execution of the instruction.

The video codec is configured to compress or decompress a digital video. The electronic device may support one or more video codecs. In this way, the electronic device may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device, for example, image recognition, facial recognition, voice recognition, and text understanding.

A memory may be further arranged in the processor 410, and is configured to store instructions and data. In some embodiments, the memory in the processor 410 is a cache memory. The memory may store an instruction or data that has just been used or cyclically used by the processor 410. If the processor 410 needs to use the instruction or the data again, the processor may directly invoke the instruction or the data from the memory, to avoid repeated access and reduce a waiting time of the processor 410, thereby improving system efficiency.

In some embodiments, the processor 410 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The GPIO interface may be configured by using software. The GPIO interface may be configured to transmit a control signal, or may be configured to transmit a data signal. In some embodiments, the GPIO interface may be configured to connect the processor 410 to the display screen 430, the camera 440, the wireless communication module 460, and the like. The GPIO interface may also be configured as an I2C interface, an I2S interface, a UART interface, an MIPI interface, and the like.

It may be understood that a schematic interface connection relationship between the modules in the embodiments is merely an example for description, and constitutes no limitation on the structure of the electronic device 400. In some other embodiments of this application, the electronic device 400 may alternatively use an interface connection manner different from that in the foregoing embodiment, or use a combination of a plurality of interface connection manners.

The external memory interface 420 may be configured to connect to an external storage card, for example, a micro SD card, to expand a storage capability of the electronic device. The external storage card communicates with the processor 410 by using the external memory interface 420, to implement a data storage function, such as storing a file such as a music or a video in the external storage card.

The internal memory 421 may be configured to store computer executable program code, and the executable program code includes instructions. The processor 410 runs the instruction stored in the internal memory 421, to perform various function applications and data processing of the electronic device 400. The internal memory 421 may include a program storage region and a data storage region. The program storage region may store an operating system, an application program required by at least one function (for example, a voice playing function or an image playing function), and the like. The data storage region may store data (for example, audio data and an address book) and the like created when the electronic device is used. In addition, the internal memory 421 may include a high-speed random access memory, or may include a non-volatile memory such as at least one magnetic disk memory, a flash memory, or a universal flash storage (universal flash storage, UFS). The processor 410 runs the instructions stored in the internal memory 421 and/or the instructions stored in the memory disposed in the processor, to implement various functional applications and data processing of the electronic device.

The electronic device implements a display function by using the GPU, the display screen 430, the application processor, and the like. The GPU is a microprocessor for image processing, and is connected to the display screen 430 and the application processor. The GPU is configured to perform mathematical and geometric calculation, and is configured to render graphics. The processor 410 may include one or more GPUs, and execute program instructions to generate or change display information.

The display screen 430 is configured to display an image, a video, and the like. The display screen 430 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oled, quantum dot light emitting diodes (quantum dot light emitting diodes, QLED), and the like. In some embodiments, the electronic device may include one or N display screens 430. N is a positive integer greater than 1.

The display screen 430 of the electronic device may display a series of graphical user interfaces (graphical user interfaces, GUIs), and these GUIs are all main screens of the electronic device. Generally, the size of the display screen 430 of the electronic device is fixed, and only a limited number of controls can be displayed in the display screen 430 of the electronic device. A control is a GUI element, is a software component included in an application, and controls all data processed by the application and an interaction with these data, and a user may interact with the control through a direct manipulation (direct manipulation), to read or edit related information of the application. Generally, the controls may include visual interface elements such as icons, buttons, menus, tabs, text boxes, dialog boxes, status bars, navigation bars, and Widgets. For example, in this embodiment of this application, the display screen 430 may display a virtual key (one-key arrangement, start arrangement, and scene arrangement).

The electronic device may implement a photographing function by using the ISP, the camera 440, the video codec, the GPU, the display screen 430, the AP, and the like.

The ISP is configured to process data fed back by the camera 440. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may further optimize noise point, brightness, and skin tone algorithms. The ISP may further optimize parameters such as exposure and color temperature of a shooting scene. In some embodiments, the ISP may be disposed in the camera 440.

The camera 440 includes a lens and a photosensitive element (also an image sensor). The camera 440 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device may include one or N cameras 440, and N is a positive integer greater than 1.

The DSP is configured to process a digital signal, and in addition to a digital image signal, may further process another digital signal. For example, when the electronic device performs frequency selection, the digital signal processor is configured to perform Fourier transform and the like on frequency energy.

A wireless communication function of the electronic device may be implemented by using the antenna 1, the antenna 2, the mobile communication module 450, the wireless communication module 460, the modem processor, the baseband processor, and the like.

The antenna 1 and the antenna 2 are configured to transmit and receive an electromagnetic wave signal. Each antenna in the electronic device may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 450 may provide a solution to wireless communication such as 2G/3G/4G/5G applied to the electronic device. The mobile communication module 450 may include at least one filter, a switch, a power amplifier, a low noise amplifier (low noise amplifier, LNA), and the like. The mobile communication module 450 may receive an electromagnetic wave through the antenna 1, perform processing such as filtering and amplification on the received electromagnetic wave, and transmit a processed electromagnetic wave to the modem processor for demodulation. The mobile communication module 450 may further amplify a signal modulated by the modem processor, and convert the signal into an electromagnetic wave for radiation through the antenna 1. In some embodiments, at least some function modules of the mobile communication module 450 may be disposed in the processor 410. In some embodiments, at least some function modules of the mobile communication module 450 and at least some modules of the processor 410 may be disposed in a same component.

The wireless communication module 460 may provide a solution to wireless communication applicable to the electronic device, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 460 may be one or more devices integrating at least one communication processing module. The wireless communication module 460 receives an electromagnetic wave through the antenna 2, performs frequency modulation and filtering processing on an electromagnetic wave signal, and sends a processed signal to the processor 410. The wireless communication module 460 may alternatively receive a to-be-sent signal from the processor 410, perform frequency modulation and amplification on the to-be-sent signal, and convert the signal into an electromagnetic wave for radiation by using the antenna 2.

The ambient light sensor 470 is configured to sense an ambient light brightness. The electronic device may adaptively adjust a luminance of the display screen 430 according to perceived ambient light brightness. The ambient light sensor 470 may also be configured to automatically adjust white balance during photographing. The ambient light sensor 470 may further cooperate with the optical proximity sensor to detect whether the electronic device is in a pocket, so as to prevent an accidental touch.

In addition, an operating system runs on the foregoing components, for example, a HarmonyOS system, an iOS operating system, an Android operating system, a Windows operating system, and the like. An application may be installed and run on the operating system.

Figure 4B:
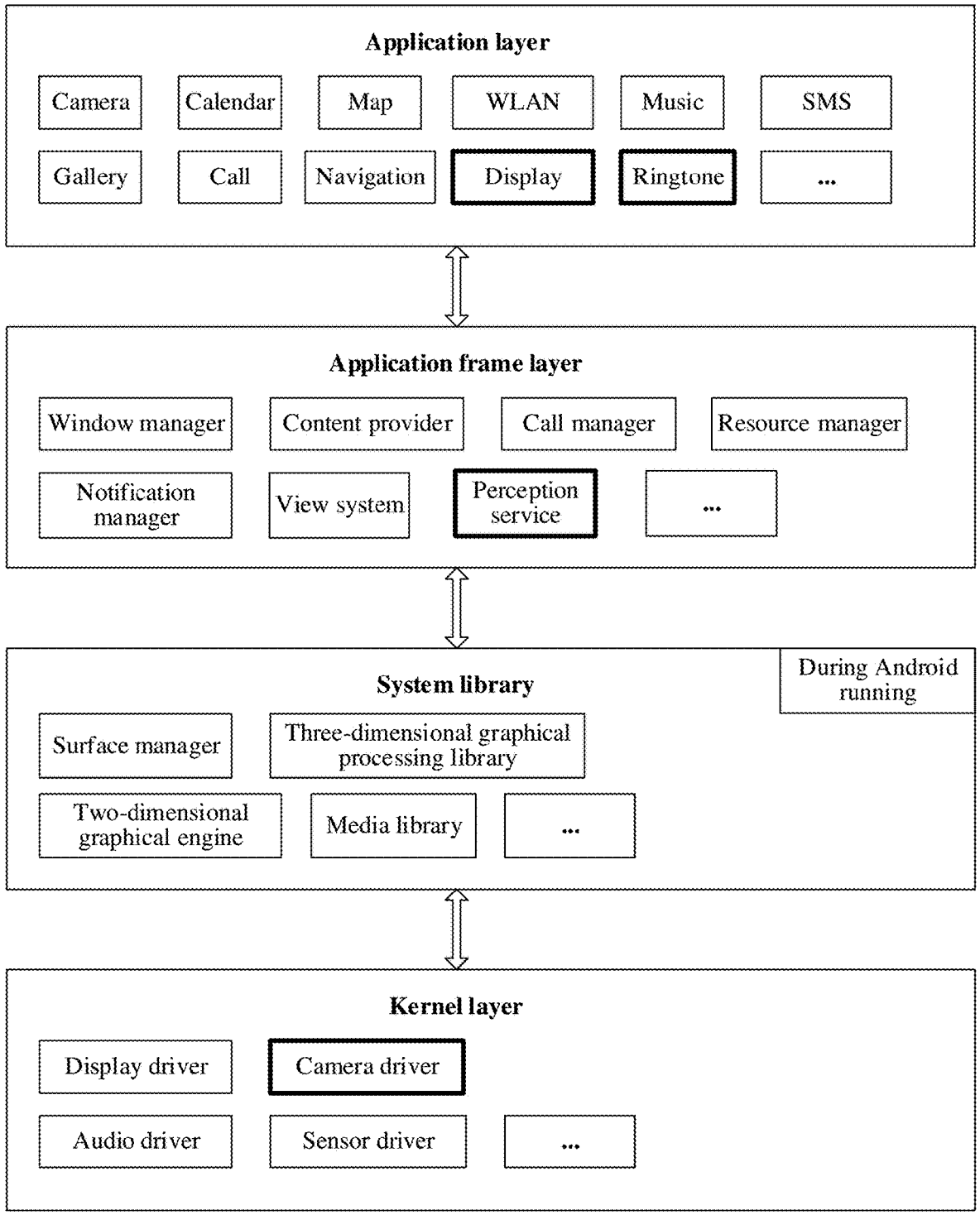
FIG. 4B is an example diagram of a software structure of an electronic device according to an embodiment of this application.

FIG. 4B is a block diagram of a software structure of the electronic device according to an embodiment of this application.

In the layered architecture, software is divided into several layers, and each layer has a clear role and task. Layers communicate with each other through a software interface. In some embodiments, the Android system is divided into four layers that are respectively an application layer, an application framework layer, an Android runtime (Android runtime) and system library, and a kernel layer from top to bottom.

The application layer may include a series of application packages. As shown in FIG. 4B, the application packages may include applications such as camera, photos, calendar, phone, maps, navigation, WLAN, display, music, ringtone, and SMS messages.

The application framework layer provides an application programming interface (application programming interface, API) and a programming framework for the applications at the application layer. The application framework layer includes some predefined functions. As shown in FIG. 4B, the application framework layer may include a window manager, a content provider, a phone manager, a resource manager, a notification manager, a view system, and the like. In some embodiments of this application, the application framework layer may further include an awareness service.

The window manager is configured to manage a window application. The window manager may obtain a size of a display screen, determine whether there is a status bar, lock the screen, capture the screen, and the like.

The content provider is configured to store and obtain data, so that the data can be accessed by an application. The data may include a video, an image, an audio, calls made and answered, a browsing history and bookmarks, an address book, and the like.

The phone manager is configured to provide a communication function of the electronic device, for example, call state management (including getting through, hang-up, and the like).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, the electronic device vibrates, or an indicator light flashes.

The view system includes a visual control such as a control for text display or a control for picture display. The view system may be configured to construct an application. A display interface may be formed by one or more views. For example, a display interface including an SMS notification icon may include a view for displaying text and a view for displaying a picture.

The perception service is used for performing the AO solution proposed above. In the process of performing the AO solution in the perception service, if it is detected that human eyes in a frame of image gaze at the display screen, displaying of an application layer is controlled to be in a non-turned off mode, and the ringtone is played at a reduced volume when a bell needs to be outputted.

The Android Runtime includes a kernel library and a virtual machine. The Android runtime is responsible for scheduling and managing the Android system. In some embodiments of this application, cold start of an application may run in an Android runtime, the Android runtime obtains an optimized file status parameter of the application, and further the Android runtime may determine, by using the optimized file status parameter, whether the optimized file is out of date due to system upgrading, and return a determining result to an application control module.

The kernel library includes two parts: One part is a performance function that the Java language needs to invoke, and the other part is a kernel library of Android.

The application layer and the application framework layer run on the virtual machine. The virtual machine executes Java files of the application layer and the application framework layer as binary files. The virtual machine is used to execute functions such as object lifecycle management, stack management, thread management, security and exception management, and garbage collection.

The system library may include a plurality of function modules, such as a surface manager (surface manager), a media library (Media Libraries), a three-dimensional graphics processing library (for example, OpenGL ES), and a 2D graphics engine (for example, SGL).

The surface manager is configured to manage a display subsystem, and converge 2D and 3D layers of a plurality of applications.

The media library supports playback and recording of a plurality of common audio and video formats, a static image file, and the like. The media library may support a plurality of audio and video encoding formats, for example, MPEG 4, H.264, MP3, AAC, AMR, JPG, and PNG.

The three-dimensional graphics processing library is used for implementing three-dimensional graphics drawing, image rendering, composition, layer processing, and the like.

The 2D graphics engine is a drawing engine for 2D drawings.

The kernel layer is a layer between hardware and software. The kernel layer includes at least a display driver, a camera driver, an audio driver, and a sensor driver. The camera driver is configured to configure a parameter for the camera to turn on or turn off the camera.

It should be noted that, although this embodiment of this application is described by using an Android system as an example, the basic principle is also applicable to an electronic device based on an operating system such as HarmonyOS, iOS, and Windows.

Embodiment 1

Figure 5:
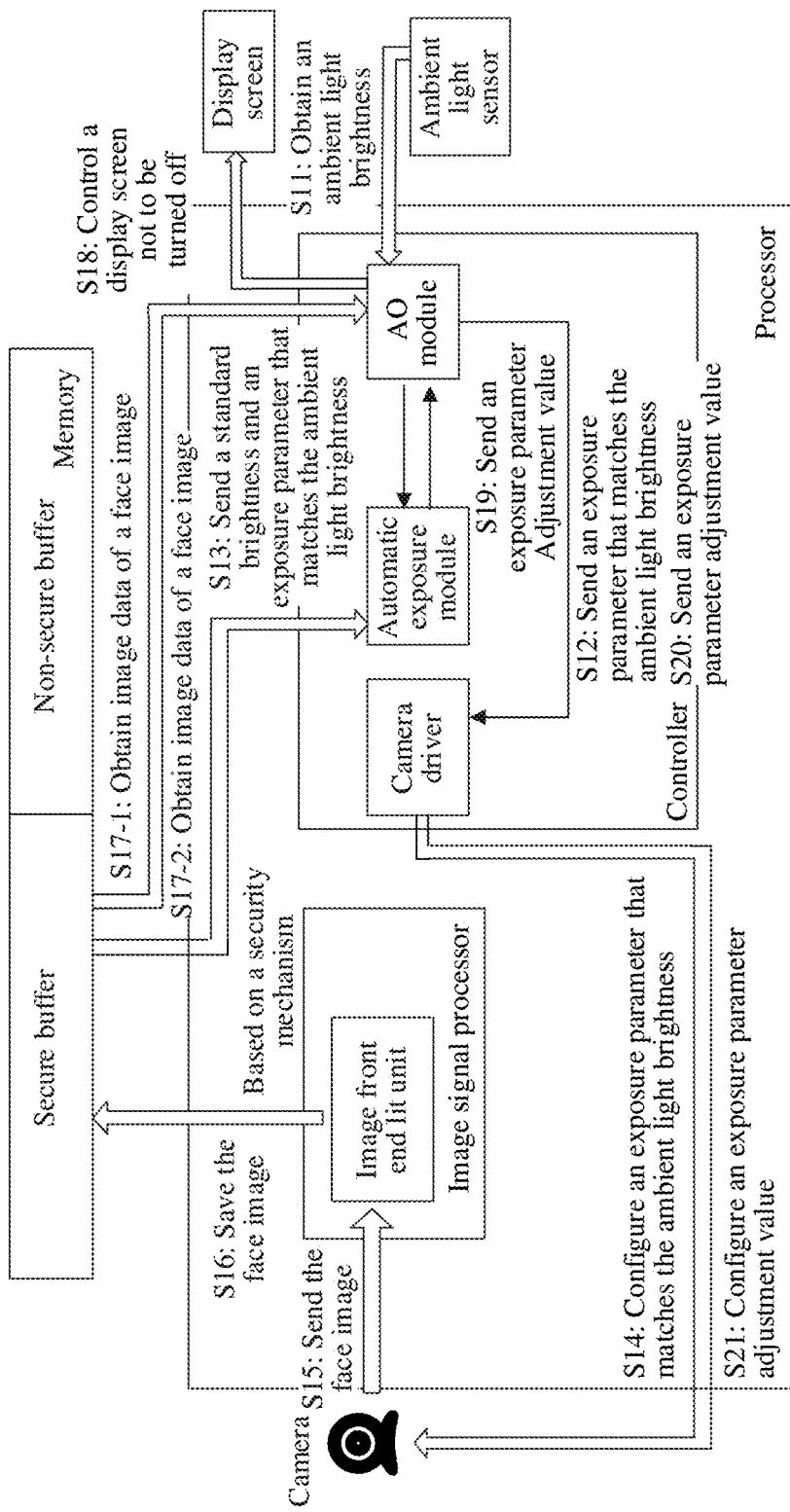
FIG. 5 is a schematic structural diagram of an electronic device according to Embodiment 1 of this application.

To solve the foregoing problem 1, an embodiment of this application provides a controller, which may be understood as a processing unit of the processor shown in FIG. 4A. Referring to FIG. 5, the controller includes an AO module, an automatic exposure module, and a camera driver. The AO module, the automatic exposure module, and the camera driver are all logic units of the controller, with functions as described above.

In this embodiment, the AO module is configured with an ambient light brightness-exposure parameter correspondence table. In some embodiments, the ambient light brightness-exposure parameter correspondence table includes a plurality of ambient light brightnesses and exposure parameters that match the ambient light brightnesses. In some other embodiments, the ambient light brightness-exposure parameter correspondence table includes a plurality of ambient light brightness intervals and exposure parameters that match the ambient light brightness intervals.

In some embodiments, the exposure parameter includes at least one of an exposure duration and a gain. Since the gain generally includes a digital gain and an analog gain, the exposure parameter may include at least one of an exposure duration, a digital gain, and an analog gain.

The exposure duration refers to the shutter speed, that is, the time for which the shutter is pressed. A longer exposure duration indicates a greater total number of photons to a surface of the image sensor and indicates a brighter image captured by the camera, and on the contrary, a darker image. However, if the image is overexposed, the image is excessively bright and image details are lost; and if the image is underexposed, the image is excessively dark and image details may likewise be lost.

The analog gain and the digital gain refer to amplified gains of signals after double sampling, and are used for controlling an image sensor to acquire data. Greater analog gain and digital gain indicate a brighter image captured by the camera; and smaller analog gain and digital gain indicate a darker image captured by the camera.

In some embodiments, a method for generating the ambient light brightness-exposure parameter correspondence table includes the following steps:

A front camera of an electronic device is configured to capture images based on a plurality of exposure parameters in an ambient light brightness, and acquires images that are captured by the front camera in different ambient light brightnesses and in which human eyes gaze at the display screen, to obtain a plurality of frames of sample images in the different ambient light brightnesses.

For each ambient light brightness, the plurality of frames of sample images in the ambient light brightness is processed according to the following method, to obtain an exposure parameter that matches the ambient light brightness.

The AO module identifies, by using image data of one frame of sample image, whether human eyes in the sample image gaze at the display screen. If the AO module identifies that the human eyes in the image do not gaze at the display screen, the sample image is ignored and a next frame of sample image in the ambient light brightness is acquired; if the AO module identifies that the human eyes in the image gaze at the display screen, an exposure parameter corresponding to the sample image is recorded and a next frame of sample image in the ambient light brightness is acquired. In this way, exposure parameters corresponding to a plurality of frames of sample images recorded in an ambient light brightness are obtained, and an exposure parameter that matches the ambient light brightness is obtained through calculation by using the recorded exposure parameters corresponding to the frames of sample images in the ambient light brightness.

In some embodiments, an intermediate value of the recorded exposure parameters corresponding to the plurality of frames of sample images is selected as the exposure parameter that matches the ambient light brightness; in some other embodiments, an average of the recorded exposure parameters corresponding to the plurality of frames of sample images is calculated as the exposure parameter that matches the ambient light brightness; and in some other embodiments, one frame of sample image is randomly selected from the recorded plurality of frames of sample images, and an exposure parameter corresponding to the selected sample image is used as the exposure parameter that matches the ambient light brightness.

In some other embodiments, a method for generating the ambient light brightness-exposure parameter correspondence table includes the following steps:

When the automatic exposure module performs the process of adjusting the exposure parameter of the camera, an adjusted exposure parameter corresponding to an image brightness that has a difference with the standard brightness meeting a preset value is recorded, and the ambient light brightness corresponding to the process of adjusting the exposure parameter of the camera by the automatic exposure module is also recorded. The ambient light brightness-exposure parameter correspondence table is constructed by using each recorded ambient light brightness and the exposure parameters adjusted by the automatic exposure module.

Table 1 below provides an example of the ambient light brightness-exposure parameter correspondence table. The correspondence table shown in this example includes a plurality of ambient light brightness intervals, and exposure durations and analog gains that match the ambient light brightness intervals.

TABLE 1

| Ambient light brightness (lux) | Analog gain (0-1023) | Exposure duration (μs) |
|---|---|---|
| <150 | 891 | 4025 |
| 150-250 | 835 | 4025 |
| 250-350 | 694 | 4025 |
| 350-450 | 619 | 4025 |
| 450-550 | 300 | 3618 |
| 550-650 | 300 | 3522 |
| 650-750 | 300 | 2599 |
| 750-850 | 300 | 2534 |
| 850-950 | 300 | 2206 |
| 950-1050 | 300 | 1566 |
| 1050-1300 | 300 | 1326 |
| 1350-1550 | 300 | 949 |
| 1550-2000 | 300 | 599 |
| 2000-4000 | 300 | 487 |
| >4000 | 300 | 85 |

When the ambient light brightness is small, in first five lines shown in Table 1, the exposure duration corresponding to the ambient light brightnesses is 4025 μs, which is the maximum exposure duration. Therefore, the ambient light brightness-exposure parameter correspondence table provided in Table 1 gives preference to the shutter, that is, when the ambient light brightness is low, the maximum exposure duration is preferentially set.

Table 2 below provides another example of an ambient light brightness-exposure parameter correspondence table.

The correspondence table shown in this example also includes a plurality of ambient light brightness intervals, and exposure durations and analog gains that match the ambient light brightness intervals.

TABLE 2

| Ambient light brightness (lux) | Analog gain (0-1023) | Exposure duration (μs) |
|---|---|---|
| <150 | 1023 | 3200 |
| 150-250 | 1023 | 3165 |
| 250-350 | 1023 | 3082 |
| 350-450 | 1023 | 2954 |

TABLE 2-continued

| Ambient light brightness (lux) | Analog gain (0-1023) | Exposure duration (μs) |
|---|---|---|
| 450-550 | 1023 | 2726 |
| 550-650 | 890 | 2034 |
| 650-750 | 827 | 1890 |
| 750-850 | 670 | 1679 |
| 850-950 | 512 | 1432 |
| 950-1050 | 425 | 1428 |
| 1050-1300 | 300 | 1326 |
| 1350-1550 | 300 | 949 |
| 1550-2000 | 300 | 599 |
| 2000-4000 | 300 | 487 |
| >4000 | 300 | 85 |

The ambient light brightness-exposure parameter correspondence table shown in Table 2 gives preference to the gain. Similarly, as can be seen from data in the first five lines: when the ambient light brightness is low, the maximum analog gain is preferentially set.

It should be noted that both Table 1 and Table 2 are ambient light brightness-exposure duration-analog gain correspondence tables, which do not constitute a limit to the ambient light brightness-exposure parameter correspondence table. When the camera supports a digital gain adjustment value, the ambient light brightness-exposure parameter correspondence table may include correspondences between ambient light brightnesses and exposure durations, analog gains, and digital gains.

In this embodiment, as shown in FIG. 5, the AO module performs steps S11 of obtaining an ambient light brightness measured by an ambient light sensor and screening an ambient light brightness-exposure parameter correspondence table, to obtain an exposure parameter that matches the ambient light brightness measured by the ambient light sensor, and performs step S12 of sending the exposure parameter that matches the ambient light brightness to a camera driver. In some embodiments, the AO module may further obtain a standard brightness, and then step S13 of sending the standard brightness and the exposure parameter that matches the ambient light brightness to the automatic exposure module is performed.

After the camera driver receives the exposure parameter that matches the ambient light brightness, step S14 of configuring the camera to run based on the exposure parameter that matches the ambient light brightness is performed. The camera runs based on the exposure parameter that matches the ambient light brightness, and step S15 of capturing a face image of a user and sending the captured face image is performed. The IFE lit unit performs step S16 of reading the face image and storing the face image to a secure buffer of a memory based on a security mechanism.

It can be understood that the exposure parameter that matches the ambient light brightness screened by the AO module can also be referred to as an initial exposure parameter. The camera may obtain a face image by running based on the initial exposure parameter and capturing the face image at a capturing frequency of the camera. Generally, the camera may capture a plurality of frames of face images by running based on the initial exposure parameter.

The AO module performs step S17-1 of obtaining image data of the face image stored in the secure buffer of the memory and then determining, by analyzing the image data, whether human eyes of the user gaze at the display screen. When AO module determines that the human eyes of the user gaze at the display screen, step S18 of controlling the display screen of the electronic device not to be turned off is performed. The method for the AO module to analyze the image data to determine whether the human eyes of the user gaze at the display screen may be shown in the following Embodiment 3.

The automatic exposure module performs step S17-2 of obtaining the image data of the face image stored in the secure buffer of the memory and then calculating an image brightness of the face image by using the image data of the face image; and comparing the image brightness of the face image and the standard brightness, to obtain a comparison result. In some embodiments, the image data of the face image obtained by the automatic exposure module includes red (Red), green (Green), and blue (Blue) components of each pixel included in the face image. The automatic exposure module calculates an average of the red, green, and blue components of each pixel as the image brightness of the face image.

If the comparison result reflects that the difference between the image brightness of the face image and the standard brightness is less than a preset value, the automatic exposure module does not perform an operation, and the camera still runs based on the exposure parameter that matches the ambient light brightness.

If the comparison result reflects that the difference between the image brightness of the face image and the standard brightness is not less than the preset value, the automatic exposure module is further configured to adjust, according to the comparison result, the exposure parameter that matches the ambient light brightness, to obtain an exposure parameter adjustment value. The automatic exposure module then performs step S19 of transmitting the exposure parameter adjustment value to the AO module, so that the AO module performs, after receiving the exposure parameter adjustment value, step S20 of sending the exposure parameter adjustment value to the camera driver. The camera driver configures, as shown in step S21, the camera to run based on the exposure parameter adjustment value, to capture an image.

Stop conditions for the adjustment of the exposure parameter by the automatic exposure module are described above. In some embodiments, the exposure parameter adjustment value after the automatic exposure module adjusts the exposure parameter for the last time is sent to the AO module, and the AO module updates the exposure parameter adjustment value to the ambient light brightness-exposure parameter correspondence table as the exposure parameter that matches the ambient light brightness measured by the ambient light sensor in the correspondence table. As the automatic exposure module performs the process of adjusting the exposure parameter of the camera, the ambient light brightness-exposure parameter correspondence table may be updated accordingly, and the updated ambient light brightness-exposure parameter correspondence table may be saved to the memory by the AO module. This memory refers to the internal memory 421 shown in FIG. 4A.

Figure 6:
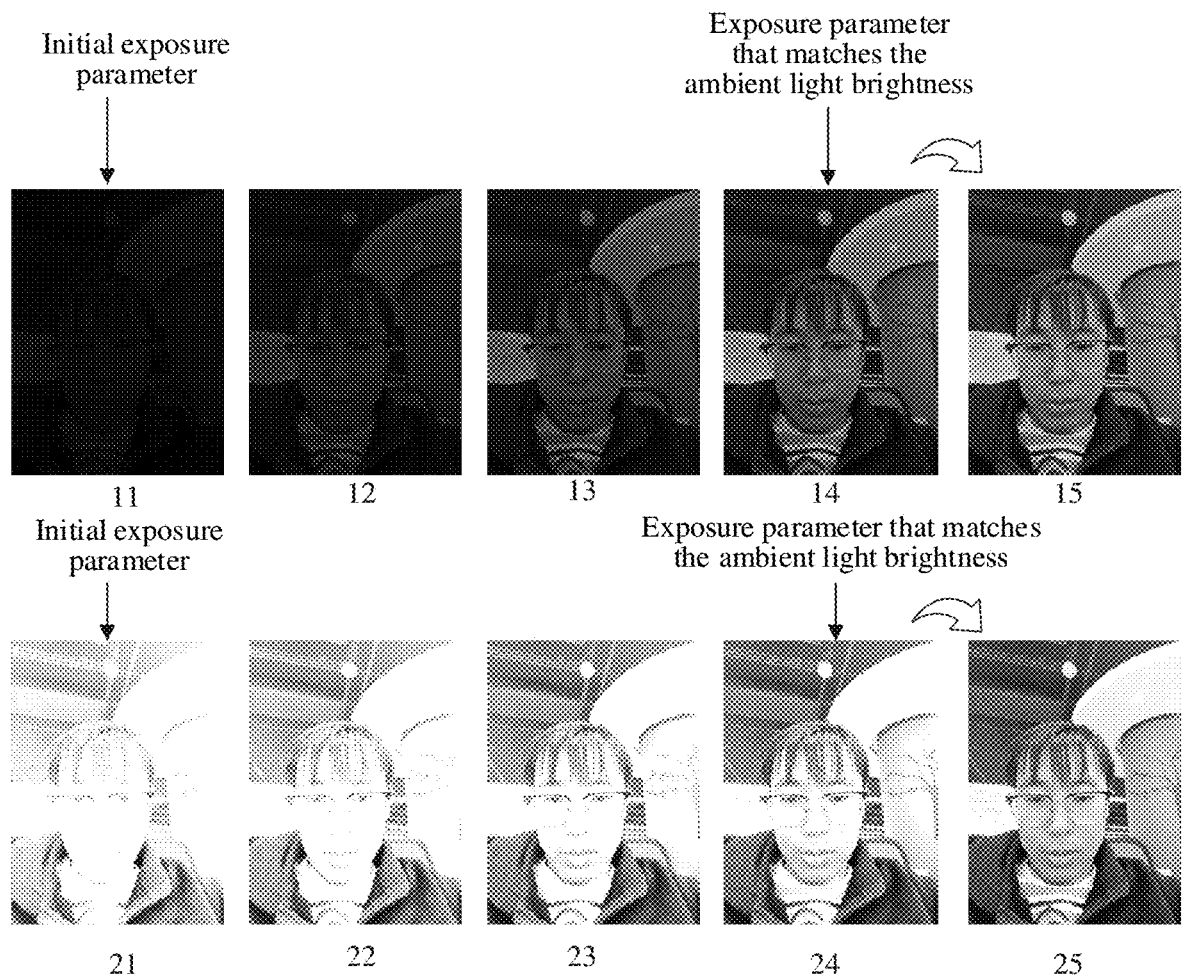
FIG. 6 is a diagram illustrating a plurality of frames of images captured by a camera according to Embodiment 1 of this application.

As mentioned above, the image captured by the camera that runs based on the universal exposure parameter in a dark environment is the image 11 shown in FIG. 6. In this embodiment, the camera is also in a dark environment, but runs based on the exposure parameter that matches the ambient light brightness to perform capturing, and a captured image is the image 14 shown in FIG. 6. The automatic exposure module obtains image data of the image 14 and adjusts, according to the processing procedure proposed in the foregoing content and by the image data of the image 14, the exposure parameter that matches the ambient light brightness and is configured for the camera, to obtain an exposure parameter adjustment value. The image captured by the camera based on the exposure parameter adjustment value is the image 15 that meets a brightness requirement.

Similarly, the image captured by the camera that runs based on the universal exposure parameter in a bright environment is the image 21 shown in FIG. 6. In this embodiment, the camera is also in a dark environment, but runs based on the exposure parameter that matches the ambient light brightness to perform capturing, and a captured image is the image 24 shown in FIG. 6. The automatic exposure module obtains image data of the image 24 and adjusts, according to the processing procedure proposed in the foregoing content and by the image data of the image 24, the exposure parameter that matches the ambient light brightness and is configured for the camera, to obtain an exposure parameter adjustment value. The image captured by the camera based on the exposure parameter adjustment value is the image 25 that meets a brightness requirement.

It can be seen that: the AO module screens the ambient light brightness-exposure parameter correspondence table, to obtain the exposure parameter that matches the ambient light brightness measured by the ambient light sensor, and configures the exposure parameter for the camera through the camera driver, so as to ensure that the image brightness of the image captured by the camera that runs based on the exposure parameter is relatively rational, not excessively bright nor excessively dark; and in this way, the automatic exposure module does not need to adjust the exposure parameter repeatedly, and the time for the adjustment of the exposure parameter of the camera by the automatic exposure module is reduced.

In addition, the automatic exposure module can quickly obtain through adjustment an exposure parameter that meets a requirement of the image brightness, and the AO module can determine, by using an image brightness meeting a requirement, whether human eyes in an image gaze at the display screen, thereby ensuring the determining accuracy of the AO module.

Embodiment 2

Figure 7:
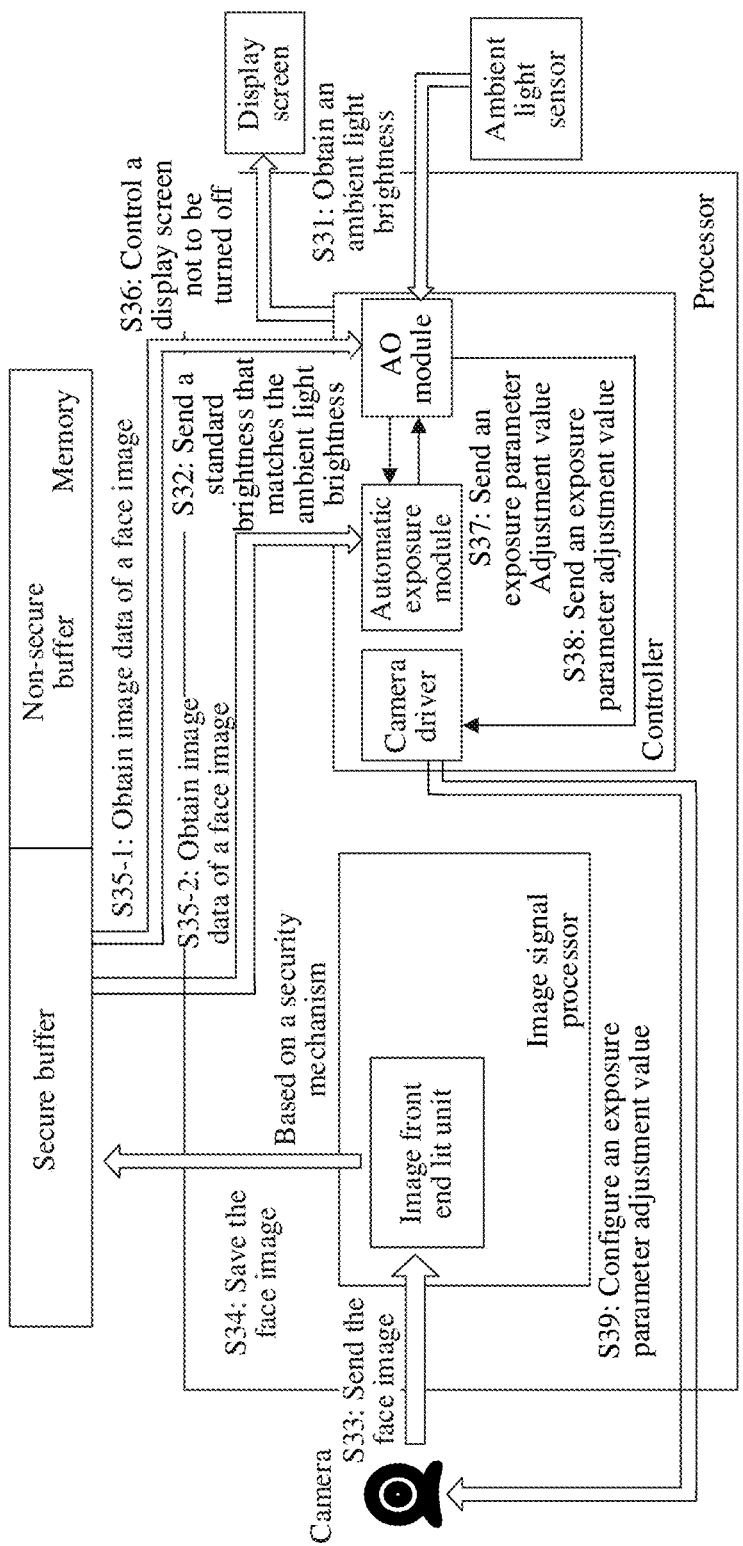
FIG. 7 is a schematic structural diagram of an electronic device according to Embodiment 2 of this application.

To solve the foregoing problem 2, another embodiment of this application further provides a controller, which may be understood as a processing unit of the processor shown in FIG. 4A. Referring to FIG. 7, the controller includes an AO module, an automatic exposure module, and a camera driver. The AO module, the automatic exposure module, and the camera driver are all logic units of the controller, with functions as described above.

In this embodiment, the AO module is configured with an ambient light brightness-standard brightness correspondence table. In some embodiments, the ambient light brightness-standard brightness correspondence table includes a plurality of ambient light brightnesses and standard brightnesses that match the ambient light brightnesses. In some other embodiments, the ambient light brightness-standard brightness correspondence table includes a plurality of ambient light brightness intervals and standard brightnesses that match the ambient light brightness intervals.

The standard brightnesses may be used for adjusting the exposure parameter of the camera, so that an image captured by the camera has a target brightness be reached. A value range of standard brightness is: 0-1024. In different ambient light brightnesses, the standard brightnesses are slightly different. Therefore, a correspondence table of different ambient light brightnesses and standard brightnesses is constructed.

In some embodiments, a method for generating the ambient light brightness-standard brightness correspondence table includes the following steps:

A front camera of an electronic device is configured to capture images based on a plurality of exposure parameters in an ambient light brightness, and acquires images that are captured by the front camera in different ambient light brightnesses and in which human eyes gaze at the display screen, to obtain a plurality of frames of sample images in the different ambient light brightnesses.

For each ambient light brightness, the plurality of frames of sample images in the ambient light brightness is processed according to the following method, to obtain a standard brightness that matches the ambient light brightness.

The AO module identifies, by using image data of one frame of sample image, whether human eyes in the sample image gaze at the display screen. If the AO module identifies that the human eyes in the image do not gaze at the display screen, the sample image is ignored and a next frame of sample image in the ambient light brightness is acquired; if the AO module identifies that the human eyes in the image gaze at the display screen, an image brightness of the sample image is recorded and a next frame of sample image in the ambient light brightness is acquired. In this way, image brightnesses of a plurality of frames of sample images recorded in an ambient light brightness are obtained, and a standard brightness that matches the ambient light brightness is obtained through calculation by using the recorded image brightnesses of the plurality of frames of sample images in the ambient light brightness.

In some embodiments, an intermediate value of the recorded image brightnesses of the plurality of frames of sample images is selected as the standard brightness that matches the ambient light brightness; in some other embodiments, an average of the recorded image brightnesses of the plurality of frames of sample images is calculated as the standard brightness that matches the ambient light brightness; and in some other embodiments, an image brightness of one frame of sample image that is randomly selected from the recorded plurality of frames of sample images is used as the standard brightness that matches the ambient light brightness.

In some embodiments, for each selected frame of sample image, an average of red (Red), green (Green), and blue (Blue) components of each pixel is calculated by using the red (Red), green (Green), and blue (Blue) components of each pixel in the sample image, and is used as the image brightness of the sample image.

Table 3 below provides an ambient light brightness-standard brightness correspondence table, which shows standard brightnesses that match a plurality of ambient light brightness intervals.

TABLE 3

| Ambient light brightness (lux) | Standard brightness (0-1024) |
|---|---|
| <150 | 480 |
| 150-250 | 488 |
| 250-350 | 503 |
| 350-450 | 508 |
| 450-550 | 510 |
| 550-650 | 511 |
| 650-750 | 512 |
| 750-850 | 512 |
| 850-950 | 512 |
| 950-1050 | 512 |

TABLE 3-continued

| Ambient light brightness (lux) | Standard brightness (0-1024) |
|---|---|
| 1050-1300 | 513 |
| 1350-1550 | 515 |
| 1550-2000 | 520 |
| 2000-4000 | 525 |
| >4000 | 532 |

In this embodiment, as shown in FIG. 7, the AO module performs step S31 of obtaining an ambient light brightness measured by an ambient light sensor and screening an ambient light brightness-standard brightness correspondence table, to obtain a standard brightness that matches the ambient light brightness measured by the ambient light sensor; and performs step S32 of sending the screened standard brightness that matches the ambient light brightness to the automatic exposure module.

The camera runs based on the configured initial exposure parameter, and step S33 of capturing a face image of a user and sending the face image is performed. The IFE lit unit performs step S34 of reading the face image and storing the face image to a secure buffer of a memory based on a security mechanism.

In some embodiments, the initial exposure parameter configured for the camera may be a universal exposure parameter set in advance; and in some other embodiments, the initial exposure parameter configured for the camera may be an exposure parameter that matches an ambient light brightness, as described in Embodiment 1.

The AO module performs step S35-1 of obtaining image data of the face image stored in the secure buffer of the memory and then determining, by analyzing the image data, whether human eyes of the user gaze at the display screen. When AO module determines that the human eyes of the user gaze at the display screen, step S36 of controlling the display screen of the electronic device not to be turned off is performed. The method for the AO module to analyze the image data to determine whether the human eyes of the user gaze at the display screen may be shown in the following Embodiment 3.

The automatic exposure module is configured to obtain a standard brightness from the AO module, and is further configured to perform step S35-2 of obtaining the image data of the face image stored in the secure buffer of the memory and then calculating an image brightness of the face image by using the image data of the face image; and comparing the image brightness of the face image and the standard brightness screened by and sent from the automatic exposure module, to obtain a comparison result. In some embodiments, the image data of the face image obtained by the automatic exposure module includes red (Red), green (Green), and blue (Blue) components of each pixel included in the face image. The automatic exposure module calculates an average of the red, green, and blue components of each pixel as the image brightness of the face image.

If the comparison result reflects that the difference between the image brightness of the face image and the standard brightness is less than a preset value, the automatic exposure module does not perform an operation, and the camera still runs based on the initial exposure parameter. If the comparison result reflects that the difference between the image brightness of the face image and the standard brightness is not less than the preset value, the automatic exposure module is further configured to adjust, according to the comparison result, the exposure parameter that matches the ambient light brightness that is screened by the AO module, to obtain an exposure parameter adjustment value.

The automatic exposure module then performs step S37 of sending the exposure parameter adjustment value to the AO module, so that the AO module performs, after receiving the exposure parameter adjustment value, step S38 of transmitting the exposure parameter adjustment value to the camera driver. The camera driver performs step S39 of configuring the camera to run based on the exposure parameter adjustment value, to capture an image.

Figure 8:
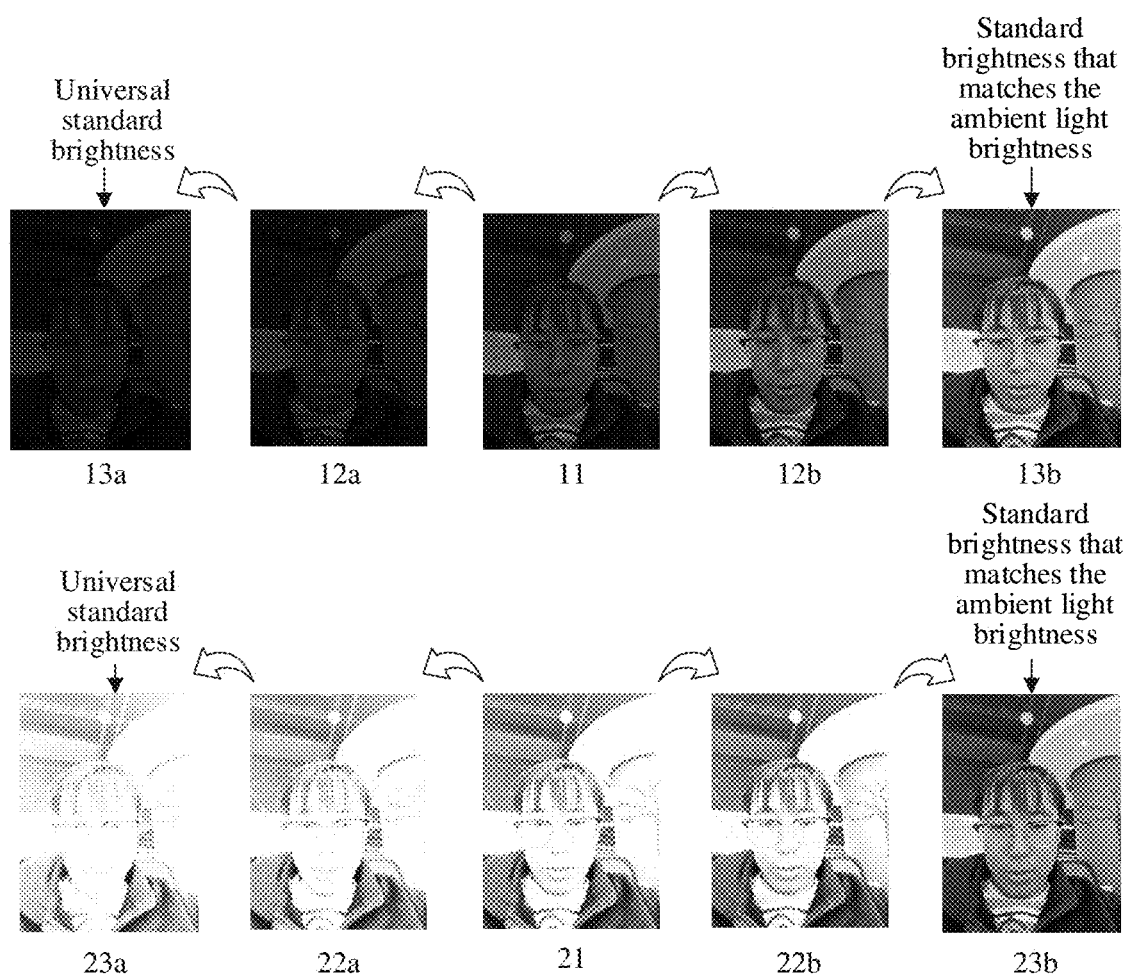
FIG. 8 is a diagram illustrating a plurality of frames of images captured by a camera according to Embodiment 2 of this application.

In an example, the automatic exposure module obtains a universal standard brightness, and the image in the common standard brightness is shown as an image 13*a* in FIG. 8. The image captured by the camera in the dark environment is an image 11 shown in FIG. 8, and the automatic exposure module obtains image data of the image 11, compares the image data with the universal standard brightness, which can be understood as comparing with an image brightness of the image 13*a*, and adjusts an exposure parameter of the camera according to a comparison result. The camera may successively capture an image 12*a* and an image 13*a*, and the automatic exposure module determines that an image brightness of the image 13*a*, when obtained through capturing, meets a requirement of the standard brightness. However, the image brightness of the image 13*a* is not high, and an erroneous determining is quite apt to occur if the image is provided to the AO module for determining whether human eyes in the image gaze at the display screen.

In this embodiment, the standard brightness obtained by the automatic exposure module matches the ambient light brightness, and the image in the standard brightness is an image 13*b* shown in FIG. 8. The automatic exposure module obtains the image data of the image 11, compares the image data and the standard brightness that matches the ambient light brightness, that is, compares the image data with the image brightness of the image 13*b*, and adjusts the exposure parameter of the camera according to a comparison result. The camera may successively capture an image 12*b* and an image 13*b*, and the automatic exposure module determines that an image brightness of the image 13*b* meets a requirement of the standard brightness. As can be seen from FIG. 8, the image brightness of the image 13*b* is more rational. In this way, the accuracy of determining, by using the image by the AO module, whether the human eyes in the image gaze at the display screen is high.

Similarly, in a bright environment with strong light, an image in a universal standard brightness is shown as an image 23*a* in FIG. 8, and an image of the standard brightness that matches the ambient light brightness is shown as an image 23*b* in FIG. 8. The image captured by the camera is an image 21, the exposure parameter of the camera is adjusted according to the universal standard brightness, and the camera may perform capturing successively to obtain an image 22*a* and an image 23*a*. The image brightnesses are increasing, the exposure parameter of the camera is adjusted according to the standard brightness that matches the ambient light brightness, and the camera performs capturing successively to obtain an image 22*b* and an image 23*b*.

It can be seen that: the AO module screens the ambient light brightness-standard brightness correspondence table, to obtain the standard brightness that matches the ambient light brightness measured by the ambient light sensor, and send the standard brightness to the automatic exposure module. The automatic exposure module adjusts the exposure parameter of the camera based on the standard brightness that matches the ambient light brightness, so that the camera performs capturing based on the exposure parameter adjustment value, to obtain an image meeting the requirement of the standard brightness of the ambient light brightness, the image quality of the image captured by the camera is ensured and the accuracy of determining, by the AO module, whether human eyes in the image gaze at the display screen is increased.

Embodiment 3

Figure 9:
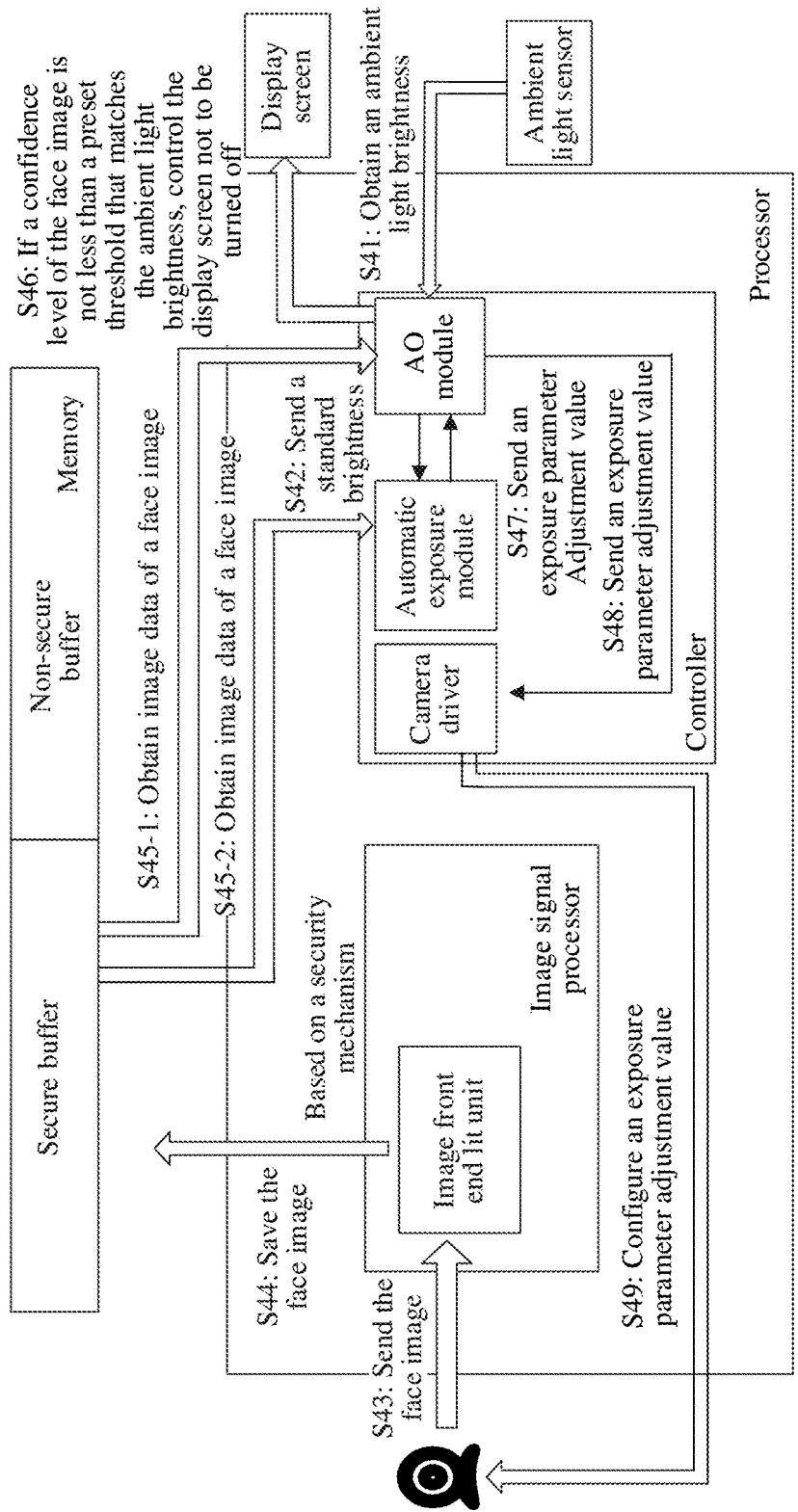
FIG. 9 is a schematic structural diagram of an electronic device according to Embodiment 3 of this application.

To solve the foregoing problem 3, another embodiment of this application further provides a controller, which may be understood as a processing unit of the processor shown in FIG. 4A. Referring to FIG. 9, the controller includes an AO module, an automatic exposure module, and a camera driver. The AO module, the automatic exposure module, and the camera driver are all logic units of the controller, with functions as described above.

The AO module is configured with an ambient light brightness-confidence level threshold correspondence table. In some embodiments, the ambient light brightness-confidence level threshold correspondence table includes a plurality of ambient light brightnesses and confidence level thresholds that match the ambient light brightnesses. In some other embodiments, the ambient light brightness-confidence level threshold correspondence table includes a plurality of ambient light brightness intervals and confidence level thresholds that match the ambient light brightness intervals.

In a possible implementation, in the ambient light brightness-confidence level threshold correspondence table, a confidence level threshold that matches a dark light interval and a confidence level threshold that matches a strong light interval are less than a confidence level threshold in normal light.

Table 4 below provides an ambient light brightness-confidence level threshold correspondence, which shows confidence level thresholds that match three ambient light brightness intervals, and original confidence level thresholds.

TABLE 4

| Ambient light brightness | Original confidence level threshold | Confidence level threshold |
|---|---|---|
| <10 lux | 0.95 | 0.9 |
| 10 lux-8W lux | 0.95 | 0.95 |
| >8W lux | 0.95 | 0.9 |

In Table 4, an ambient light brightness interval less than 10 lux is identified as a dark light interval, an ambient light brightness interval greater than 8 W lux is identified as a strong light interval, and an ambient light interval of 10 lux-8 W lux is a normal light interval. Table 4 illustrates an example of division of the dark light interval, the strong light interval, and the normal light interval, but the division of the dark light interval, the strong light interval, and the normal light interval is not limited to the specific values proposed in Table 4.

In Table 4, the original confidence level thresholds that match the ambient light brightness interval less than 10 lux and the ambient light brightness interval greater than 8 W lux are the same as the confidence level threshold of the ambient light brightness interval of 10 lux-8 W lux, all of which are 0.95. The image quality of images captured by the camera in dark light and strong light are not high, underexposed or overexposed, and therefore configuring the same confidence level threshold therefor as in normal light is not rational. In the solution of this embodiment shown in Table 3, the confidence level thresholds corresponding to the ambient light brightness interval less than 10 lux and the ambient light brightness interval greater than 8 W lux are set to 0.9, which is less than the confidence level threshold of the 10 lux-8 W lux ambient light brightness interval.

Table 4 shows confidence level thresholds corresponding to the three ambient light brightness intervals, and the confidence level thresholds corresponding to the three ambient light brightness intervals are not limited to the values in Table 4 and can be adjusted according to actual situations. In addition, in the ambient light brightness-confidence level threshold correspondence, the ambient light brightness intervals are not limited to the three ambient light brightness intervals provided in Table 4, and in some embodiments, the ambient light brightness-confidence level threshold correspondence may include more than three ambient light brightness intervals and confidence level thresholds that match the ambient light brightness intervals.

In this embodiment, referring to FIG. 9, the AO module performs step S41 of obtaining an ambient light brightness measured by an ambient light sensor and screening an ambient light brightness-confidence level threshold correspondence table, to obtain a confidence level threshold that matches the ambient light brightness measured by the ambient light sensor.

The AO module may further obtain a standard brightness, and then step S42 of sending the standard brightness to the automatic exposure parameter is performed. In some embodiments, the standard brightness obtained by the AO module may be a universal standard brightness. In some other embodiments, the standard brightness obtained by the AO module may be the standard brightness that matches the ambient light brightness, as described in Embodiment 2.

The camera runs based on the configured initial exposure parameter, and step S43 of capturing a face image of a user is performed. The IFE lit unit performs step S44 of reading the face image and storing the face image to a secure buffer of a memory based on a security mechanism.

In some embodiments, the initial exposure parameter configured for the camera may be a universal exposure parameter set in advance; and in some other embodiments, the initial exposure parameter configured for the camera may be an exposure parameter that matches an ambient light brightness, as described in Embodiment 1.

The AO module is further configured to perform step S45-1 of successively obtaining, according to a storage order of images, image data of each frame of face image in the image sequence stored in the secure buffer of the memory. For the image data of each frame of face image obtained by the AO module, the AO module compares the image data of the face image and a sample feature library and configures a confidence level for the image according to a comparison result of the image data of the face image and the sample feature library, the confidence level being used for representing a probability at which human eyes in the image gaze at the display screen.

In some embodiments, the sample feature library includes feature data of an image in which human eyes gaze at the display screen. A method for determining the feature data includes: obtaining a large number of sample images, which include sample images in which human eyes gaze at the display screen and sample images in which human eyes do not gaze at the display screen, and learning by using image data of each sample image, to obtain the feature data for representing that human eyes in an image gaze at the display screen.

The AO module is further configured to determine whether the confidence level of the face image is less than a screened confidence level threshold. The AO module performs step S46, shown in FIG. 9, of determining, if the confidence level of the face image is not less than the confidence level threshold, that the human eyes in the face image gaze at the display screen, to further control the display screen of the electronic device not to be turned off.

The AO module determines, if determining that the confidence level of the face image is less than the confidence level threshold, that the human eyes in the face image do not gaze at the display screen.

The automatic exposure module is configured to obtain a standard brightness from the AO module, and is further configured to perform step S45-2 of obtaining the image data of the face image stored in the secure buffer of the memory and then calculating an image brightness of the face image by using the image data of the face image; and comparing the image brightness of the face image and the standard brightness screened by and sent from the automatic exposure module, to obtain a comparison result. In some embodiments, the image data of the face image obtained by the automatic exposure module includes red (Red), green (Green), and blue (Blue) components of each pixel included in the face image. The automatic exposure module calculates an average of the red, green, and blue components of each pixel as the image brightness of the face image.

If the comparison result reflects that the difference between the image brightness of the face image and the standard brightness is less than a preset value, the automatic exposure module does not perform an operation, and the camera still runs based on the initial exposure parameter. If the comparison result reflects that the difference between the image brightness of the face image and the standard brightness is not less than the preset value, the automatic exposure module is further configured to adjust, according to the comparison result, the exposure parameter that matches the ambient light brightness that is screened by the AO module, to obtain an exposure parameter adjustment value.

The automatic exposure module then performs step S47 of sending the exposure parameter adjustment value to the AO module, so that the AO module performs, after receiving the exposure parameter adjustment value, step S48 of transmitting the exposure parameter adjustment value to the camera driver. The camera driver performs step S49 of configuring the camera to run based on the exposure parameter adjustment value, to capture an image.

In some embodiments, when determining that there is a frame of image that is among a plurality of successive frames of images and in which human eyes gaze at the display screen, the AO module controls the display screen of the electronic device not to be turned off, which is combined with the solution of controlling the display screen to be turned off according to a set screen off time for the display screen of the electronic device, and the combination method is in the following.

It is assumed that the screen off time for the electronic device is set to 15 seconds. Timing is started when the display screen of the electronic device is started to display data, and the timing expires after a specified time. For example, after 7 seconds, the front camera of the electronic device captures images, and the AO module successively obtains the images and performs the following operations for each frame of image obtained:

comparing image data of the image and a sample feature library and configuring a confidence level for the image according to a comparison result of the image data with sample feature library; determining whether the confidence level configured for the image is less than the screened confidence level threshold; if the confidence level configured for the image is not less than the confidence level threshold, determining that human eyes in the image gaze at the display screen; or if the confidence level configured for the image is less than the confidence level threshold, determining that the human eyes in the image do not gaze at the display screen; and during a period of time from 7 seconds expires to 15 seconds, if the AO module determines that there is a frame of image in which human eyes gaze at the display screen, controlling the display screen not to be turned off; or if the AO module continuously determines that human eyes in all the images do not gaze at the display screen, controlling the display screen to be turned off when the timing of 15 seconds expires.

It should be noted that the foregoing content introduces the processing procedure of the AO module by an example in which the screen off time is 15 seconds, but this does not constitute a limitation thereto.

The following is an example of illustrating the solution of this embodiment. In an example, a user watches a display screen of an electronic device in a dark light, and images successively captured by a camera in the dark environment are images 11 to 15 shown in FIG. 10. An original confidence level threshold configured for the AO module is 0.95.

Figure 10:
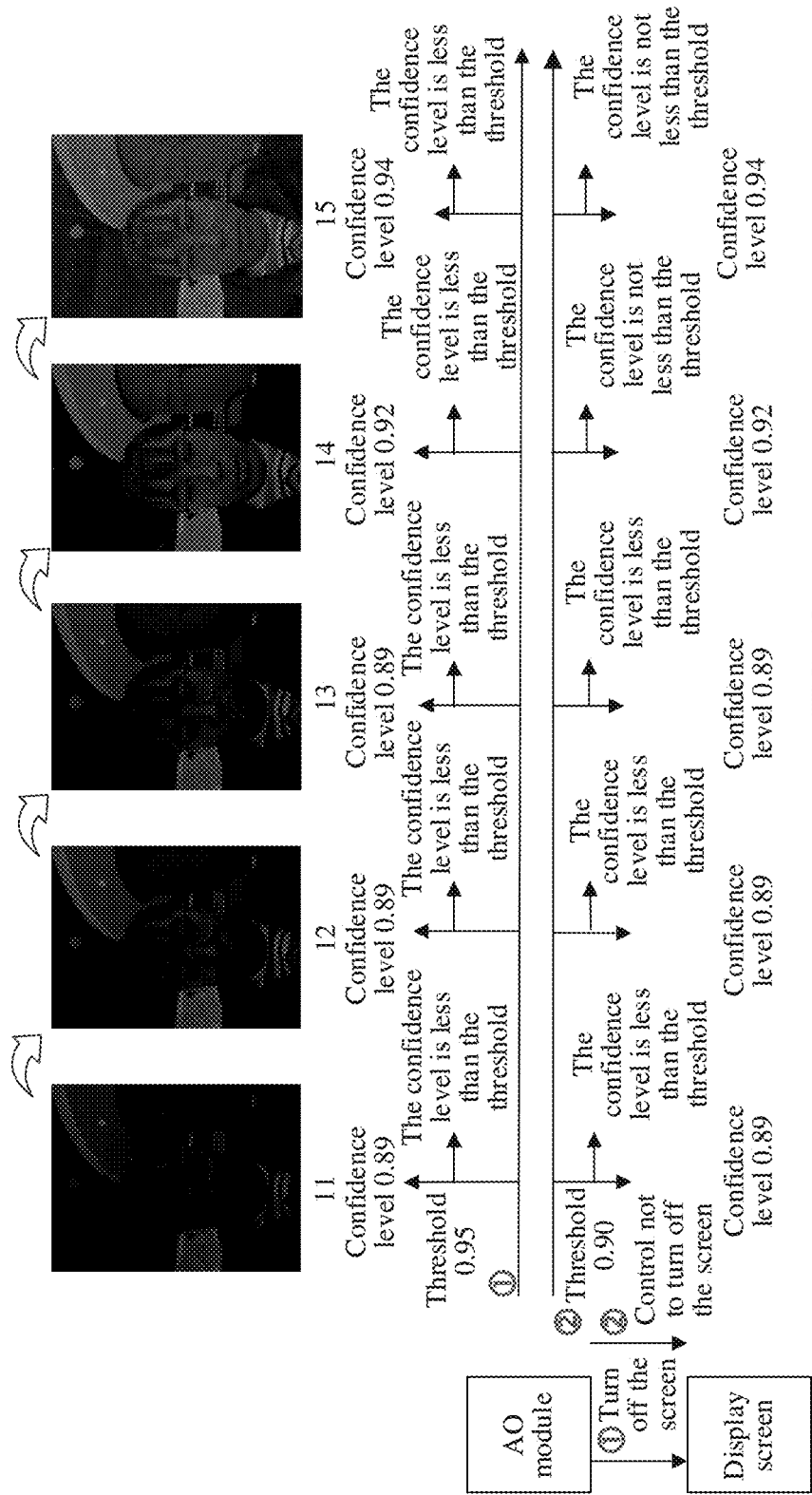
FIG. 10 is a diagram illustrating a plurality of frames of images captured by a camera according to Embodiment 3 of this application.

As shown in FIG. 10, the AO module obtains image data of the image 11, configures the confidence level of the image 11 as 0.89, determines that the confidence level 0.89 of the image 11 is less than the confidence level threshold 0.95, and determines that human eyes in the image 11 do not gaze at the display screen. The AO module obtains image data of the image 12, configures the confidence level of the image 12 as 0.89, determines that the confidence level 0.89 of the image 12 is less than the confidence level threshold 0.95, and similarly determines that human eyes in the image 12 do not gaze at the display screen. Similarly, the AO module configures confidence levels of 0.89, 0.92, and 0.94 for the image 13, the image 14, and the image 15, respectively, separately determines that the confidence level 0.89 of the image 13 is less than the confidence level threshold 0.95, the confidence level 0.92 of the image 14 is less than the confidence level threshold 0.95, and the confidence level 0.94 of the image 15 is also less than the confidence level threshold 0.95, and determines that the human eyes in all the image 13, the image 14, and the image 15 do not gaze at the display screen.

In this embodiment, the AO module obtains an ambient light brightness measured by the ambient light detection sensor and performs screening in an ambient light brightness-confidence level threshold correspondence table by using the ambient light brightness, and the screened confidence level threshold is 0.90.

As shown in FIG. 10, the AO module similarly obtains the image data of the image 11 and configures a confidence level 0.89 for the image 11. However, if it is determined that the confidence level 0.89 of the image 11 is less than the confidence level threshold 0.90, it is determined that the human eyes in the image 11 do not gaze at the display screen. The image data of the image 12 is obtained, the confidence level of the image 12 is configured as 0.89, and it is determined that the confidence level 0.89 of the image 12 is likewise less than the confidence level threshold 0.90, and it is similarly determined that the human eyes in the image 12 do not gaze at the display screen. However, the AO module configures confidence levels of 0.89, 0.92, and 0.94 for the image 13, the image 14, and the image 15 respectively, separately determines that the confidence level 0.89 of the image 13 is less than the confidence level threshold 0.90, the confidence level 0.92 of the image 14 is not less than the confidence level threshold 0.90, and the confidence level 0.94 of the image 15 is also less than the confidence level threshold 0.90, and determines that the human eyes in the image 13 do not gaze at the display screen and that the human eyes in both the image 14 and the image 15 gaze at the display screen. The AO module determines that there is a frame of image in which the human eyes gaze at the display screen and controls the display screen to not be turned off.

The foregoing example illustrates the scenario in which the user watches the display screen of the electronic device in a dark environment, and in a scenario in which a user watches an electronic device in a bright environment with strong light, the AO module determines, by using an original confidence level threshold and a confidence level threshold screened from the ambient light brightness-confidence level threshold correspondence table, a result for whether human eyes in an image gaze at the display screen, which is basically the same as the scenario in the dark light.

As can be seen from the above content, in a dark environment or in a bright environment with strong light, the image brightness of the image captured by the camera is excessively low or excessively high, the image is underexposed or overexposed, and the confidence level configured by the AO module for the image may be reduced. Correspondingly, the AO module may also screen a relatively low confidence level threshold from the ambient light brightness values-confidence level threshold correspondence table. In this way, the impact on the detection accuracy of the AO module by erroneous determining of the AO module caused by that the confidence level configured by the AO module is less than the threshold due to an insufficient or excessively high image brightness is avoided.

In the solution proposed in the foregoing embodiments, the confidence level thresholds of the dark environment and of the bright environment with strong light are reduced, which is likely to bring about the problem of erroneous determining of whether the human eyes in the image detected by the AO module gaze at the display screen. In this regard, in an optional implementation, the AO module is further configured to perform a face detection event, to assist in determining whether the human eyes in the image gaze at the display screen.

In some embodiments, the AO module is further configured to, after determining that the confidence level of the image is not less than the screened confidence level threshold, perform a face detection event and determine whether a result of the face detection event is that a face is detected. If it is determined that the result of the face detection event is that a face is detected, it is determined that the human eyes in the image gaze at the display screen. If it is determined that the result of the face detection event is that no face is detected, it is determined that no human eyes in the image gaze at the display screen.

In some other embodiments, before determining whether the confidence level of the image is less than the screened confidence level threshold, the AO module is further configured to perform a face detection event and determine whether the result of the face detection event is that a face is detected, if the result of the face detection event is that a face is detected, determine whether the confidence level of the image is less than a screened confidence level threshold, and if it is determined that the confidence level of the image is not less than the screened confidence level threshold, determine that the human eyes in the image gaze at the display screen; or if it is determined whether the result of the face detection event is that no face is detected, or it is determined that the confidence level of the image is less than the screened confidence level threshold, determine that the human eyes in the image do not gaze at the display screen.

In some other embodiments, the AO module performs, in parallel, determining whether the confidence level of the image is less than the screened confidence level threshold, and executing a face detection event to determine whether the result of the face detection event is that a face is detected; if the AO module determines that the confidence level of the image is not less than the screened confidence level threshold and determines that the result of the face detection event is that a face is detected, the AO module determines that the human eyes in the image gaze at the display screen; and otherwise, determines that the human eyes in the image do not gaze at the display screen.

There are many implementations for the AO module to perform the face detection event, which are not limited in this embodiment, and the following provides three methods:

Method 1: The AO module implements face detection by using Haar-Like features and an Adaboost algorithm. In the method, the Haar-Like features are used for representing a face, the Haar-Like features are trained to obtain a weak classifier, weak classifiers that can best represent the face are selected by the Adaboost algorithm to construct a strong classifier, and a plurality of strong classifiers are connected in series to form a cascade classifier having a cascade structure, that is, a face detector.

The AO module extracts Haar-Like features of an image captured by a camera and calls the face detector to process the extracted Haar-Like features, to obtain a face identification result, which represents whether the image captured by the camera includes a face.

Method 2: The AO module implements face detection by using Multi-scale Block based Local Binary Patterns (Multi-scale Block based Local Binary Patterns, MBLBP) features and an Adaboost algorithm. In the method, MBLBP features capable of representing face image information of a reference box and eight neighborhood boxes are used for representing a face, the MBLBP features are calculated by comparing an average grayscale of the reference box and an average grayscale of the eight surrounding neighborhood boxes, the MBLBP features are similarly trained to obtain a weak classifier, a plurality of weak classifiers that can best represent the face are selected by the Adaboost algorithm to construct a strong classifier, and a plurality of strong classifiers are connected in series to form a cascade structure of a cascade classifier, that is, a face detector.

The AO module extracts MBLBP features of image information of the reference box and the eight neighborhood boxes, and calculates the MBLBP features by comparing an average grayscale of the reference box and an average grayscale of the eight surrounding neighborhood boxes. The face detector is called to process the MBLBP features to obtain a face identification result, which represents whether the image captured by the camera includes a face.

Method 3: The AO module implements face detection by using Multi-scale Structured Ordinal Features (Multi-scale Structured Ordinal Features, MSOF) and an Adaboost algorithm. In the method, the MSOF features capable of representing face image information of the reference box and the eight neighborhood boxes are used for representing the face, distances of the eight neighborhood boxes with the reference box are adjustable, and the reference box and the eight neighborhood boxes may not be connected. Similarly, the MSOF features are trained to obtain a weak classifier, a plurality of weak classifiers that can best represent the face are selected by the Adaboost algorithm to construct a strong classifier, and a plurality of strong classifiers are connected in series to form a cascade classifier having a cascade structure, that is, a face detector.

The AO module extracts MSOF features of image information of the reference box and the eight neighborhood boxes. The face detector is called to process the MSOF features to obtain a face identification result, which represents whether the image captured by the camera includes a face.

The following is an example of illustrating the solution of this embodiment. In this example, a user watches a display screen of an electronic device in a dark light, and images successively captured by a camera in the dark environment are images 11 to 15 shown in FIG. 11. The AO module obtains an ambient light brightness measured by the ambient light detection sensor and performs screening in an ambient light brightness-confidence level threshold correspondence table by using the ambient light brightness, and the screened confidence level threshold is 0.90.

Figure 11:
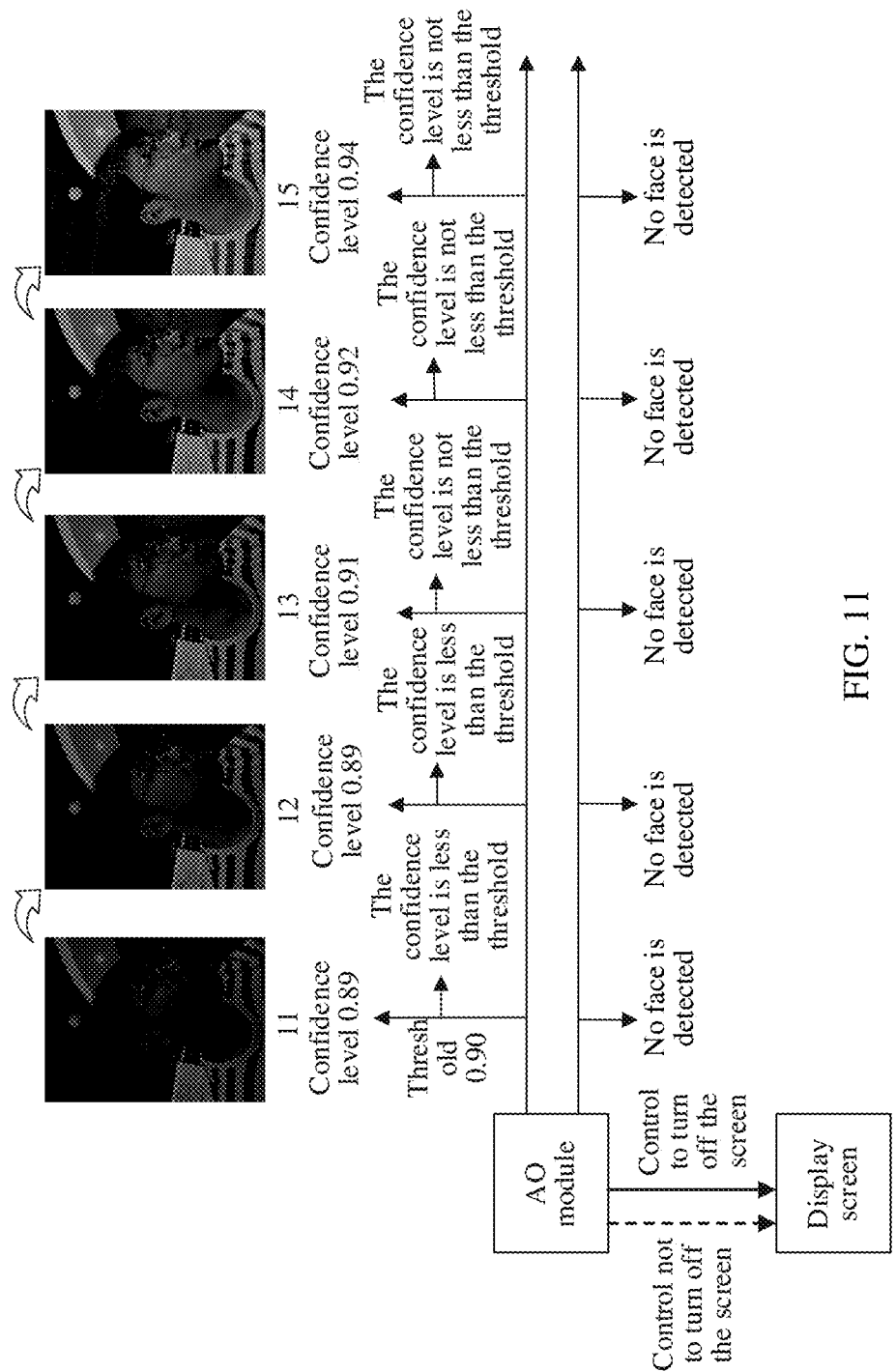
FIG. 11 is a diagram illustrating a plurality of frames of images captured by a camera according to Embodiment 3 of this application; and FIG. 12A

As shown in FIG. 11, the AO module obtains the image data of the image 11, configures the confidence level of the image 11 as 0.89, determines that the confidence level 0.89 of the image 11 is less than the confidence level threshold 0.90, and determines that the human eyes in the image 11 do not gaze at the display screen; and obtains the image data of the image 12, configures the confidence level of the image 12 as 0.89, determines that the confidence level 0.90 of the image 12 is also less than the confidence level threshold 0.90, and determines that the human eyes in the image 12 do not gaze at the display screen. Similarly, the AO module configures confidence levels of 0.91, 0.92, and 0.94 for the image 13, the image 14, and the image 15, respectively, separately determines that the confidence level 0.91 of the image 13 is not less than the confidence level threshold 0.90, the confidence level 0.92 of the image 14 is not less than the confidence level threshold 0.90, and the confidence level 0.94 of the image 15 is likewise not less than the confidence level threshold 0.90, and determines that the human eyes in all the image 13, the image 14, and the image 15 gaze at the display screen. The AO module determines that there is an image which is among successive five frames of images and in which the human eyes gaze at the display screen, and controls the display screen not to be turned off. However, it can be seen from the image 15 in FIG. 11, the human eyes of the user do not gaze at the display screen. Therefore, controlling the display screen not to be turned off is an erroneous operation.

In this example, results of performing a face detection event by the AO module on the images 11 to 15 all are that: no face is detected. In this way, the AO module determines that the confidence level of the image 0.89 is less than the confidence level threshold 0.90 for the image 11, and determines that the result of the face detection event is that no face is detected, so it is determined that the human eyes in the image 11 do not gaze at the display screen. Similarly, the AO module also determines that the human eyes in the image 12, the image 13, the image 14 and the image 15 do not gaze at the display screen, and controls the display screen to turn off.

It can be seen from the foregoing example, when the confidence level threshold in the dark environment and in the bright environment with strong light is reduced, the AO module performs a face detection event on the image captured by the camera to assist the detection of whether the human eyes in the image gaze at the display screen, thereby avoiding the problem of erroneous determining in detecting, by the AO module by using a reduced confidence level threshold, whether the human eyes in the image gaze at the display screen.

Embodiment 4

Another embodiment of this application provides a display control method, applied to an electronic device. As shown in FIG. 4A, the electronic device includes a processor, an ambient light sensor, a camera, and a display screen, and the processor includes the controller provided in the foregoing Embodiment 1, Embodiment 2, and Embodiment 3.

Figure 12A:
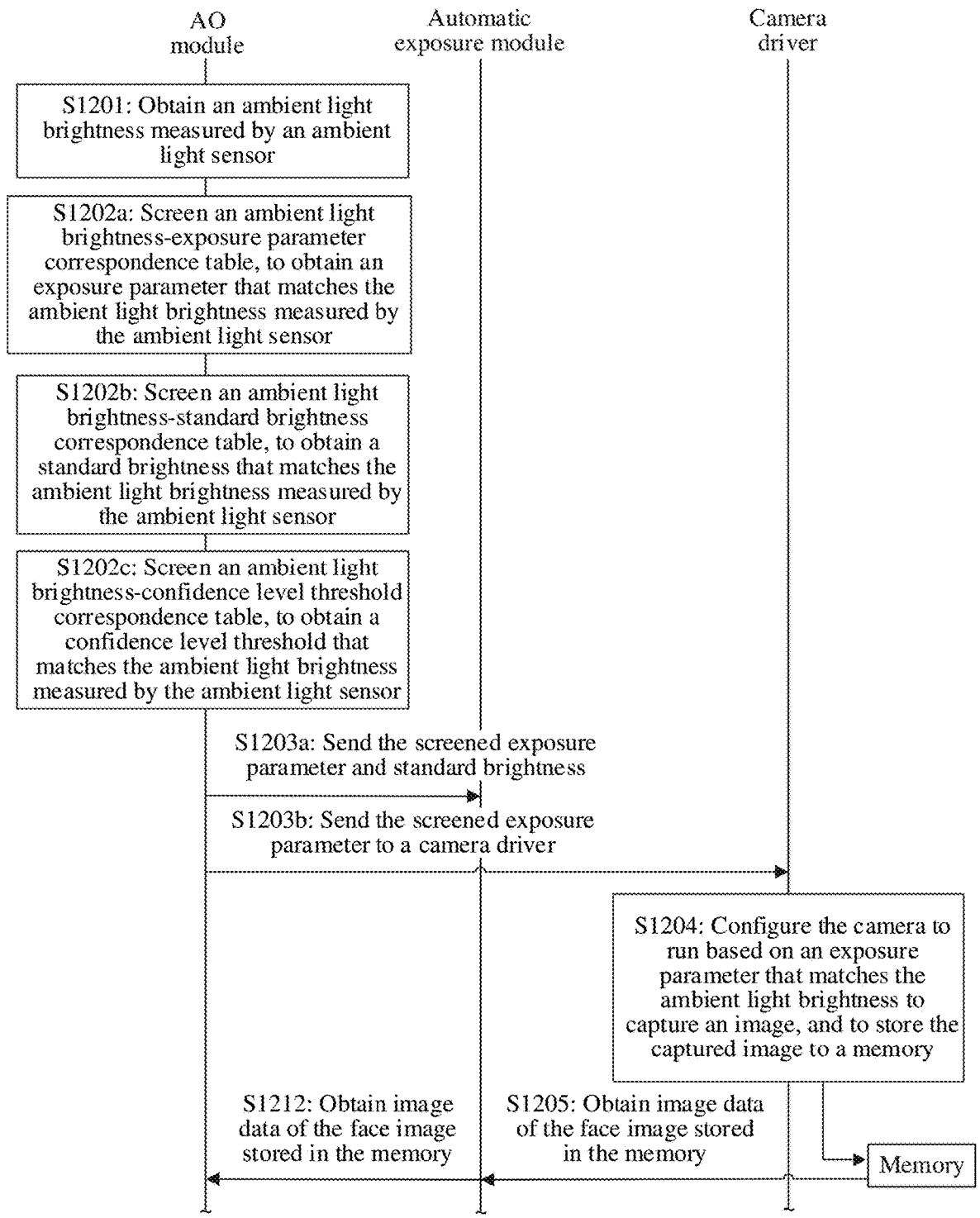
FIG. 12B is a flowchart of a display control method according to Embodiment 4 of this application.
Figure 12B:
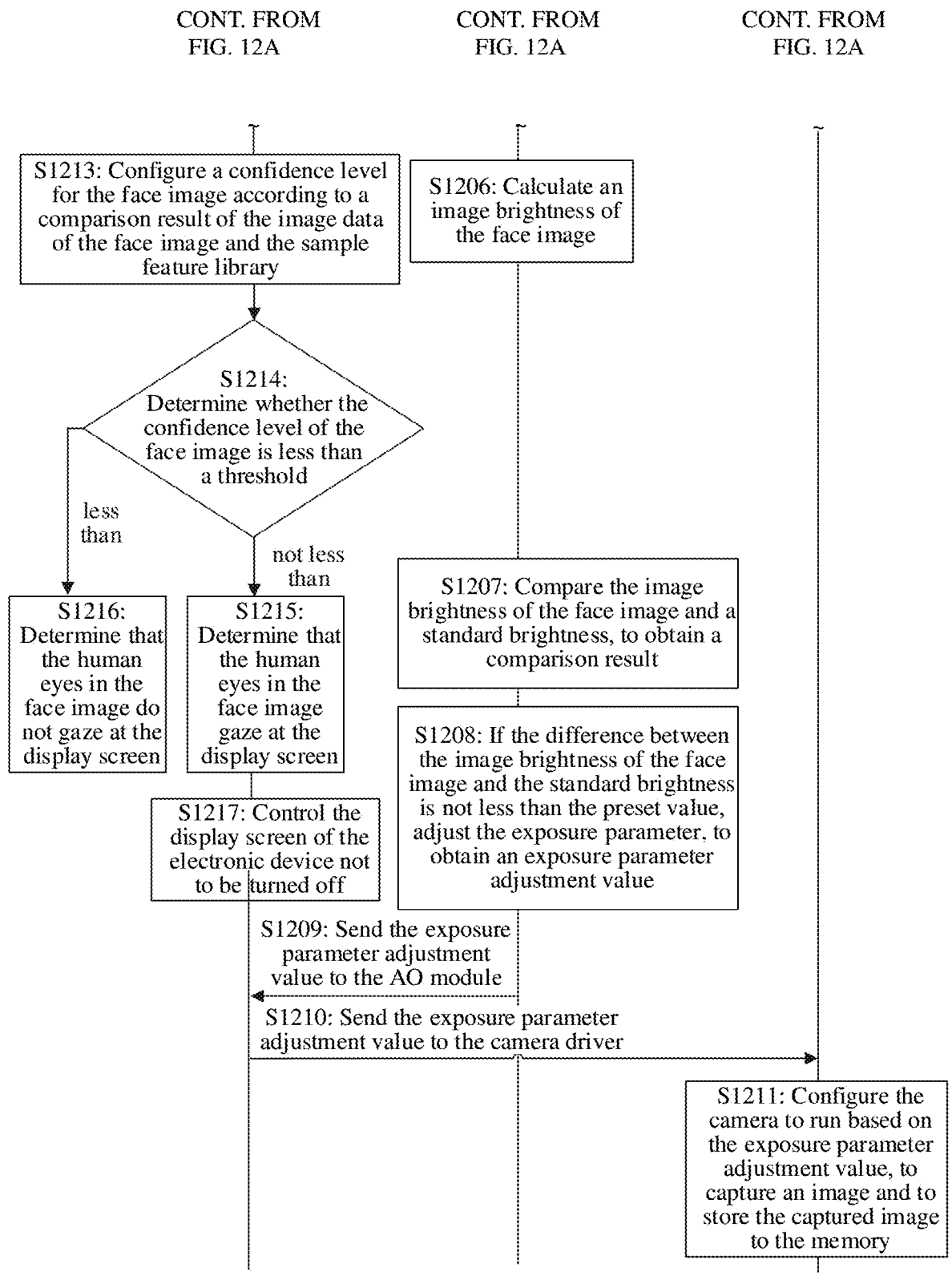

Referring to FIG. 12A and FIG. 12B, the display control method provided in this embodiment includes the following steps:

S1201: An AO module obtains an ambient light brightness measured by an ambient light sensor.

S1202*a*: The AO module screens an ambient light brightness-exposure parameter correspondence table, to obtain an exposure parameter that matches the ambient light brightness measured by the ambient light sensor.

For a specific implementation of this step, reference may be made to the content of Embodiment 1, and details are not described herein again.

Embodiment 1 illustrates, in the form of a list, the ambient light brightness-exposure parameter correspondence, which does not constitute a limitation on the displaying of the ambient light brightness-exposure parameter correspondence.

S1202*b*: The AO modules screens an ambient light brightness-standard brightness correspondence table, to obtain a standard brightness that matches the ambient light brightness measured by the ambient light sensor.

For a specific implementation of this step, reference may be made to the content of Embodiment 2, and details are not described herein again.

Similarly, Embodiment 2 illustrates, in the form of a list, the ambient light brightness-standard brightness correspondence, which does not constitute a limitation on the displaying of the ambient light brightness-standard brightness correspondence.

S1202*c*: The AO module screens an ambient light brightness-confidence level threshold correspondence table, to obtain a confidence level threshold that matches the ambient light brightness measured by the ambient light sensor.

For a specific implementation of this step, reference may be made to the content of Embodiment 3, and details are not described herein again.

Similarly, Embodiment 3 illustrates, in the form of a list, the ambient light brightness-confidence level threshold correspondence, which does not constitute a limitation on the displaying of the ambient light brightness-confidence level threshold correspondence.

FIG. 12A and FIG. 12B illustrates an execution sequence of the three steps S1202*a*, S1202*b*, and S1202*c*, but the execution sequence shown in FIG. 12A and FIG. 12B does not constitute a limitation on the execution sequence of the three steps S1202*a*, S1202*b*, and S1202*c*, and the three steps may also adopt other execution sequences or may be executed in parallel.

S1203a: The AO module sends the screened exposure parameter and standard brightness to an automatic exposure module.

S1203b: The AO module sends the screened exposure parameter to a camera driver.

S1204: The camera driver configures the camera to run based on an exposure parameter that matches the ambient light brightness to capture an image, and to store the captured image to a memory.

In the process of storing the captured image to the memory by the camera, the automatic exposure module performs steps S1205 to S1209, and the AO module performs steps S1212 to S1217. The automatic exposure module and the AO module may run in parallel without interfering with each other.

In addition, the process of performing steps S1205 to S1209 by the automatic exposure module may be understood as a solution for adjusting the exposure parameter of the camera in the display control method.

S1205: The automatic exposure module obtains an image data of a face image stored in the memory.

S1206: The automatic exposure module calculates an image brightness of the face image by using the image data of the face image.

S1207: The automatic exposure module compares the image brightness of the face image and a standard brightness, to obtain a comparison result.

If the comparison result reflects that the difference between the image brightness of the face image and the standard brightness is less than a preset value, the automatic exposure module does not perform an operation, and the camera still runs based on the exposure parameter screened by the AO module.

If the comparison result reflects that the difference between the image brightness of the face image and the standard brightness is not less than the preset value, the automatic exposure module performs S1208 of adjusting, according to the comparison result, the exposure parameter, to obtain an exposure parameter adjustment value.

S1209: The automatic exposure module sends the exposure parameter adjustment value to the AO module.

S1210: The AO module sends the exposure parameter adjustment value to the camera driver.

S1211: The camera driver configures the camera to run based on the exposure parameter adjustment value, to capture an image and to save the captured image to the memory.

S1212: The AO module obtains image data of the face image stored in the memory.

S1213: For the image data of each frame of face image obtained by the AO module, the AO module compares the image data of the face image and a sample feature library and configures a confidence level for the image according to a comparison result of the image data of the face image and the sample feature library, the confidence level being used for representing a probability at which human eyes in the image gaze at the display screen.

S1214: The AO module determines whether the confidence level of the face image is less than a screened confidence level threshold.

S1215: The AO module determines, if determining that the confidence level of the face image is not less than the confidence level threshold, that the human eyes in the face image gaze at the display screen.

S1216: The AO module determines, if determining that the confidence level of the face image is less than the confidence level threshold, that the human eyes in the face image do not gaze at the display screen.

If the AO module determines that there is a frame of face image which is among a plurality of successive frames of images and in which the human eyes gaze at the display screen, the AO module performs S1217 of controlling the display screen of the electronic device not to be turned off.

In some embodiments, if the AO module determines that there is no image which is among a plurality of successive frames of images and in which the human eyes do not gaze at the display screen, the AO module controls the display screen of the electronic device to be turned off. Specifically, the plurality of successive frames of images is captured by the camera within a period of time determined according to a screen off time of the electronic device, and for a method for determining the period of time according to the screen off time of the electronic device, reference may be made to the content of Embodiment 3.

In an implementation, after step S1212, the AO module may further perform a face detection event for each frame of obtained face image, to determine whether a result of the face detection event is that a face is detected; and if the AO module determines that the result of the face detection event of the frame of the face image is that a face is detected and a determining result of step S1214 is that the confidence level of the image is not less than the threshold, step S1215 is performed.

For the specific content of this implementation, reference may be made to the content of the foregoing Embodiment 3, and details are not described herein again.

What is claimed is:

1. A parameter adjustment method, applied to an electronic device, the electronic device comprising a front camera and a display screen, and the parameter adjustment method comprising:
    obtaining, when the display screen displays data, a first image captured by the front camera that runs based on an initial exposure parameter in response to a first instruction, the initial exposure parameter matching an ambient light brightness;
    calculating an image brightness of the first image by using image data of the first image;
    adjusting the initial exposure parameter of the front camera based on a difference between the image brightness of the first image and a standard brightness, to obtain an exposure parameter adjustment value, the exposure parameter adjustment value being used by the front camera to run based on the exposure parameter adjustment value in response to a second instruction, to capture another image;
    configuring a confidence level for the first image according to a comparison result of the image data of the first image with a sample feature library, the confidence level representing a probability that the first image comprises an image of human eyes gazing at the display screen; and
    controlling, when the confidence level of the first image is not less than a preset threshold, the display screen not to be turned off, the preset threshold matching the ambient light brightness.

2. The parameter adjustment method according to claim 1, wherein before the obtaining, when the display screen displays data, a first image captured by the front camera that runs based on an initial exposure parameter in response to a first instruction, the method further comprises:
    determining the initial exposure parameter by using the ambient light brightness, wherein the determining the initial exposure parameter by using the ambient light brightness comprises:

determining, based on an ambient light brightness-exposure parameter correspondence, an exposure parameter that matches the ambient light brightness;

wherein the ambient light brightness-exposure parameter correspondence is generated by:

obtaining a plurality of groups of sample images, each group of the sample images being corresponding to a respective ambient light brightness, each group of the sample images comprising a plurality of sample images, and each sample image corresponding to one respective exposure parameter, and generating the ambient light brightness-exposure parameter correspondence by using the ambient light brightnesses corresponding to the plurality of groups of the sample images and an exposure parameter corresponding to a sample image comprising an image of human eyes gazing at the display screen among the plurality of groups of the sample images; or obtaining a plurality of historical exposure parameter adjustment values and ambient light brightnesses corresponding to the plurality of historical exposure parameter adjustment values, each historical exposure parameter adjustment value meeting a requirement of the standard brightness, and generating the ambient light brightness-exposure parameter correspondence by using the plurality of historical exposure parameter adjustment values and the ambient light brightnesses corresponding to the plurality of historical exposure parameter adjustment values.

3. The parameter adjustment method according to claim 1, wherein before the adjusting the initial exposure parameter of the front camera based on a difference between the image brightness of the first image and a standard brightness, to obtain an exposure parameter adjustment value, the method further comprises:

determining the standard brightness by using the ambient light brightness, wherein the determining the standard brightness by using the ambient light brightness comprises:

determining, based on an ambient light brightness-standard brightness correspondence, the standard brightness that matches the ambient light brightness; and wherein:

the ambient light brightness-standard brightness correspondence is generated by obtaining a plurality of groups of sample images, each group of the sample images being corresponding one respective ambient light brightness, and each group of the sample images comprising a plurality of sample images; and generating the ambient light brightness-standard brightness correspondence by using the ambient light brightnesses corresponding to the plurality of groups of the sample images and an image brightness of a sample image comprising an image of human eyes gazing at the display screen among the plurality of groups of the sample images; or the ambient light brightness-standard brightness correspondence comprises: a plurality of ambient light brightness intervals and standard brightnesses that match the ambient light brightness intervals.

4. The parameter adjustment method according to claim 1, wherein before the controlling the display screen not to be turned off, the method further comprises:

determining that there is a frame of image which is among images captured by the front camera within a preset period of time and whose confidence level is not less than the preset threshold, the preset period of time being determined by using a screen off time set for the display screen.

5. The parameter adjustment method according to claim 1, wherein before the obtaining, when the display screen displays data, the first image captured by the front camera that runs based on an initial exposure parameter in response to a first instruction, the method further comprises:

determining the preset threshold by using the ambient light brightness, wherein the determining the preset threshold by using the ambient light brightness comprises:

determining, based on an ambient light brightness-threshold correspondence, a threshold that matches the ambient light brightness.

6. A display control method, applied to an electronic device, the electronic device comprising a front camera and a display screen, and the display control method comprising:

obtaining, when the display screen displays data, an image captured by the front camera;

configuring a confidence level for the image according to a comparison result of image data of the image with a sample feature library, the confidence level representing a probability that the image comprises an image of human eyes gazing at the display screen; and determining, when the confidence level of the image is not less than a preset threshold, that the image comprises an image of human eyes gazing at the display screen, the preset threshold matching an ambient light brightness.

7. The display control method according to claim 6, wherein after the determining, when the confidence level of the image is not less than a preset threshold, that the image comprises an image of human eyes gazing at the display screen, the method further comprises:

controlling the display screen not to be turned off.

8. The display control method according to claim 7, wherein before the controlling the display screen not to be turned off, the method further comprises:

determining that there is a frame of image which is among a plurality of frames of images captured by the front camera within a preset period of time and that comprises an image of human eyes gazing at the display screen, the preset period of time being determined by using a screen off time set for the display screen.

9. The display control method according to claim 6, wherein after the determining, when the confidence level of the image is less than the preset threshold, that the image does not comprise any image of human eyes gazing at the display screen, the method further comprises:

controlling, when none of a plurality of frames of images captured by the front camera within a preset period of time comprise an image of human eyes gazing at the display screen, the display screen to be turned off, the preset period of time being determined by using the screen off time set for the display screen.

10. The display control method according to claim 6, wherein before the determining, when the confidence level of the image is not less than a preset threshold, that the image comprises an image of human eyes gazing at the display screen, the method further comprises:

determining the preset threshold by using the ambient light brightness.

11. The display control method according to claim 10, wherein the determining the preset threshold by using the ambient light brightness comprises:

determining, based on an ambient light brightness-threshold correspondence, a threshold that matches the ambient light brightness.

12. The display control method according to claim 11, wherein the ambient light brightness-threshold correspondence comprises: a plurality of ambient light brightness intervals and thresholds that match the ambient light brightness intervals.

13. The display control method according to claim 11, wherein in the ambient light brightness-threshold correspondence, a threshold that matches a strong light interval and a threshold that matches a weak light interval are less than a threshold that matches a normal light interval.

14. The display control method according to claim 6, wherein an initial exposure parameter of the front camera matches an ambient light brightness.

15. The display control method according to claim 14, wherein before the obtaining, when the display screen displays data, an image captured by the front camera, the method further comprises:
  determining, based on an ambient light brightness-exposure parameter correspondence, the initial exposure parameter.

16. The display control method according to claim 15, wherein a method for generating the ambient light brightness-exposure parameter correspondence comprises:
  obtaining a plurality of groups of sample images, each group of the sample images being corresponding to one respective ambient light brightness, and each group of the sample images comprising a plurality of sample images, and each sample image corresponding to one respective exposure parameter; and
  generating the ambient light brightness-exposure parameter correspondence by using the ambient light brightnesses corresponding to the plurality of groups of the sample images and an exposure parameter corresponding to a sample image comprising an image of human eyes gazing at the display screen among the plurality of groups of the sample images.

17. The display control method according to claim 15, wherein the ambient light brightness-exposure parameter correspondence is generated by:
  obtaining a plurality of historical exposure parameter adjustment values and ambient light brightnesses corresponding to the plurality of historical exposure parameter adjustment values, each historical exposure parameter adjustment value meeting a requirement of standard brightness; and
  generating the ambient light brightness-exposure parameter correspondence by using the plurality of historical exposure parameter adjustment values and the ambient light brightnesses corresponding to the plurality of historical exposure parameter adjustment values.

18. The display control method according to claim 14, wherein the initial exposure parameter comprises at least one of: an exposure duration, an analog gain, or a digital gain.

19. The display control method according to claim 6, wherein before the determining that the image comprises an image of human eyes gazing at the display screen, the method further comprises:
  obtaining a face detection result of the image; and
  determining that the face detection result is that a face is detected.

20. An electronic device, comprising:
  a display screen, configured to display data;
  an ambient light detector, configured to detect ambient light to obtain an ambient light brightness;
  a front camera, configured to run, when the display screen displays data, based on an initial exposure parameter to capture an image;
  one or more processors; and
  a memory, on which a program is stored, wherein
  the program, when executed by the one or more processors, causes the electronic device to perform operations comprising:
    obtaining, when the display screen displays the data, a first image captured by the front camera that runs based on an initial exposure parameter in response to a first instruction, the initial exposure parameter matching an ambient light brightness;
  calculating an image brightness of the first image by using image data of the first image;
  adjusting the initial exposure parameter of the front camera based on a difference between the image brightness of the first image and a standard brightness, to obtain an exposure parameter adjustment value, the exposure parameter adjustment value being used by the front camera to run based on the exposure parameter adjustment value in response to a second instruction, to capture another image;
  configuring a confidence level for the first image according to a comparison result of the image data of the first image with a sample feature library, the confidence level representing a probability that the first image comprises an image of human eyes gazing at the display screen; and
  controlling, when the confidence level of the first image is not less than a preset threshold, the display screen not to be turned off, the preset threshold matching the ambient light brightness.

* * * * *